(12) United States Patent
Oikonomidis

(10) Patent No.: US 8,229,822 B2
(45) Date of Patent: *Jul. 24, 2012

(54) COMPUTER-IMPLEMENTED METHOD FOR FINANCIAL ANALYSIS

(76) Inventor: Charalampos Oikonomidis, Marousi-Athens (GR)

( * ) Notice: Subject to any disclaimer, the term of this patent is extended or adjusted under 35 U.S.C. 154(b) by 0 days.

This patent is subject to a terminal disclaimer.

(21) Appl. No.: 13/271,885

(22) Filed: Oct. 12, 2011

(65) Prior Publication Data
US 2012/0030085 A1 Feb. 2, 2012

Related U.S. Application Data

(63) Continuation of application No. 12/122,294, filed on May 16, 2008, now Pat. No. 8,041,618.

(30) Foreign Application Priority Data

May 29, 2007 (GR) .................................. 070100319

(51) Int. Cl.
*G06Q 40/00* (2012.01)
(52) U.S. Cl. ........................................... 705/35; 705/38
(58) Field of Classification Search ...................... 705/35
See application file for complete search history.

(56) References Cited

U.S. PATENT DOCUMENTS

| | | | | |
|---|---|---|---|---|
| 5,812,988 | A * | 9/1998 | Sandretto | 705/36 R |
| 2002/0042751 | A1* | 4/2002 | Sarno | 705/26 |
| 2004/0230468 | A1* | 11/2004 | King et al. | 705/10 |
| 2006/0235782 | A1 | 10/2006 | Oikonomidis et al. | |
| 2010/0010931 | A1* | 1/2010 | Rivest et al. | 705/39 |

OTHER PUBLICATIONS

Financial Management Thoery and Practice by Eugene F Brigham and Louis C Gapenski; Eight edition; 1997. pp. 398-400. Reference cited by Applicant.*
Asset Pricing—Macro Nexus and Return-Cash Flow Predictability by Ravi Bansal and Amir Yaron May 8, 2006. savage.Wharton.upenn.edu.*
Pricing the Going Concern, Richard C. Scott, Journal of Small Business Management: Jul. 1977: p. 37.
Valuing an Insurance Agency, Charles T. Bidek, et al. Society of Chartered Property and Casualty Underwriters. CPCU Journal, Jun. 1988; p. 80-92.
The Value of Waiting in Lawmaking, Francesco Parisi, et al., European Journal of Law and Economics, 2004, pp. 131-148, vol. 18.
Financial Management, Theory and Practice; E.F. Brigham, L.C. Gapenski, Eighth Edition, 1997, pp. 398-400.

* cited by examiner

*Primary Examiner* — Shahid Merchant
*Assistant Examiner* — John Anderson
(74) *Attorney, Agent, or Firm* — Gordon & Jacobson, PC

(57) ABSTRACT

A computer-implemented method for evaluating an investment employs entries and associated impact groups to define analytical lines that represent financial activity of a business entity over time. Distribution factors can be used to allocate the value of the respective entries over corresponding user-defined time periods. Annual entries can be defined and allocated into corresponding entries. Conditional calculations pertaining to the analytical lines can also be carried out. In addition, rules-based logic can be used to adjust dates pertaining to the analytical lines (such as shifting days ahead in manner that accommodates for non working days). The analytical lines are processed to simulate information that forecasts financial activity of the business entity. The user can apply variation factors to numeric values used in the method. Such variation factors permit the method to quickly and conveniently model scenarios that affect a primary entry or item or other calculation.

22 Claims, 17 Drawing Sheets

FIG. 11

Example of Date shifting thru the use of "Rule to Find Date" and Rule for "Non Working Days"
"Primary Entry" on "Jan 25 of 2007"
"Impact Group's" Orientation = Month
"Impact Group's" "Impact Target" = "Bank by Valeur"
"Rule to Find Date" = "+30 Days" & "+2 Days of Valeur"
Rule for "Bank non Working Days" = "Move to Next"

| Initial Date | Add Rule to Find Date | New Date | After checking of Bank Working Date | Add Days of Valeur | New Date | After checking of Bank Working Date |
|---|---|---|---|---|---|---|
| Monday, January 01, 2007 | 30 | Wednesday, January 31, 2007 | Wednesday, January 31, 2007 | 2 | Friday, February 02, 2007 | Friday, February 02, 2007 |
| Tuesday, January 02, 2007 | 30 | Thursday, February 01, 2007 | Thursday, February 01, 2007 | 2 | Saturday, February 03, 2007 | Monday, February 05, 2007 |
| Wednesday, January 03, 2007 | 30 | Friday, February 02, 2007 | Friday, February 02, 2007 | 2 | Sunday, February 04, 2007 | Monday, February 05, 2007 |
| Thursday, January 04, 2007 | 30 | Saturday, February 03, 2007 | Monday, February 05, 2007 | 2 | Wednesday, February 07, 2007 | Wednesday, February 07, 2007 |
| Friday, January 05, 2007 | 30 | Sunday, February 04, 2007 | Monday, February 05, 2007 | 2 | Wednesday, February 07, 2007 | Wednesday, February 07, 2007 |
| Saturday, January 06, 2007 | 30 | Monday, February 05, 2007 | Monday, February 05, 2007 | 2 | Wednesday, February 07, 2007 | Wednesday, February 07, 2007 |
| Sunday, January 07, 2007 | 30 | Tuesday, February 06, 2007 | Tuesday, February 06, 2007 | 2 | Thursday, February 08, 2007 | Thursday, February 08, 2007 |
| Monday, January 08, 2007 | 30 | Wednesday, February 07, 2007 | Wednesday, February 07, 2007 | 2 | Friday, February 09, 2007 | Friday, February 09, 2007 |
| Tuesday, January 09, 2007 | 30 | Thursday, February 08, 2007 | Thursday, February 08, 2007 | 2 | Saturday, February 10, 2007 | Monday, February 12, 2007 |
| Wednesday, January 10, 2007 | 30 | Friday, February 09, 2007 | Friday, February 09, 2007 | 2 | Sunday, February 11, 2007 | Monday, February 12, 2007 |
| Thursday, January 11, 2007 | 30 | Saturday, February 10, 2007 | Monday, February 12, 2007 | 2 | Wednesday, February 14, 2007 | Wednesday, February 14, 2007 |
| Friday, January 12, 2007 | 30 | Sunday, February 11, 2007 | Monday, February 12, 2007 | 2 | Wednesday, February 14, 2007 | Wednesday, February 14, 2007 |
| Saturday, January 13, 2007 | 30 | Monday, February 12, 2007 | Monday, February 12, 2007 | 2 | Wednesday, February 14, 2007 | Wednesday, February 14, 2007 |
| Sunday, January 14, 2007 | 30 | Tuesday, February 13, 2007 | Tuesday, February 13, 2007 | 2 | Thursday, February 15, 2007 | Thursday, February 15, 2007 |
| Monday, January 15, 2007 | 30 | Wednesday, February 14, 2007 | Wednesday, February 14, 2007 | 2 | Friday, February 16, 2007 | Friday, February 16, 2007 |
| Tuesday, January 16, 2007 | 30 | Thursday, February 15, 2007 | Thursday, February 15, 2007 | 2 | Saturday, February 17, 2007 | Monday, February 19, 2007 |
| Wednesday, January 17, 2007 | 30 | Friday, February 16, 2007 | Friday, February 16, 2007 | 2 | Sunday, February 18, 2007 | Monday, February 19, 2007 |
| Thursday, January 18, 2007 | 30 | Saturday, February 17, 2007 | Monday, February 19, 2007 | 2 | Wednesday, February 21, 2007 | Wednesday, February 21, 2007 |
| Friday, January 19, 2007 | 30 | Sunday, February 18, 2007 | Monday, February 19, 2007 | 2 | Wednesday, February 21, 2007 | Wednesday, February 21, 2007 |
| Saturday, January 20, 2007 | 30 | Monday, February 19, 2007 | Monday, February 19, 2007 | 2 | Wednesday, February 21, 2007 | Wednesday, February 21, 2007 |
| Sunday, January 21, 2007 | 30 | Tuesday, February 20, 2007 | Tuesday, February 20, 2007 | 2 | Thursday, February 22, 2007 | Thursday, February 22, 2007 |
| Monday, January 22, 2007 | 30 | Wednesday, February 21, 2007 | Wednesday, February 21, 2007 | 2 | Friday, February 23, 2007 | Friday, February 23, 2007 |
| Tuesday, January 23, 2007 | 30 | Thursday, February 22, 2007 | Thursday, February 22, 2007 | 2 | Saturday, February 24, 2007 | Monday, February 26, 2007 |
| Wednesday, January 24, 2007 | 30 | Friday, February 23, 2007 | Friday, February 23, 2007 | 2 | Sunday, February 25, 2007 | Monday, February 26, 2007 |
| Thursday, January 25, 2007 | 30 | Saturday, February 24, 2007 | Monday, February 26, 2007 | 2 | Wednesday, February 28, 2007 | Wednesday, February 28, 2007 |
| Friday, January 26, 2007 | 30 | Sunday, February 25, 2007 | Monday, February 26, 2007 | 2 | Wednesday, February 28, 2007 | Wednesday, February 28, 2007 |
| Saturday, January 27, 2007 | 30 | Monday, February 26, 2007 | Monday, February 26, 2007 | 2 | Wednesday, February 28, 2007 | Wednesday, February 28, 2007 |
| Sunday, January 28, 2007 | 30 | Tuesday, February 27, 2007 | Tuesday, February 27, 2007 | 2 | Thursday, March 01, 2007 | Thursday, March 01, 2007 |
| Monday, January 29, 2007 | 30 | Wednesday, February 28, 2007 | Wednesday, February 28, 2007 | 2 | Friday, March 02, 2007 | Friday, March 02, 2007 |
| Tuesday, January 30, 2007 | 30 | Thursday, March 01, 2007 | Thursday, March 01, 2007 | 2 | Saturday, March 03, 2007 | Monday, March 05, 2007 |
| Wednesday, January 31, 2007 | 30 | Friday, March 02, 2007 | Friday, March 02, 2007 | 2 | Sunday, March 04, 2007 | Monday, March 05, 2007 |

Working Date
Non Working Date

COMPUTER-IMPLEMENTED METHOD FOR FINANCIAL ANALYSIS

CROSS-REFERENCE TO RELATED APPLICATIONS

This application is a continuation of U.S. patent application Ser. No. 12/122,294, filed on May 16, 2008, now U.S. Pat. No. 8,041,618 which claims the benefit of Greek Patent Application 20070100319, filed May 29, 2007, and which is related to U.S. Ser. No. 11/279,259, filed Apr. 11, 2006, all of which are hereby incorporated by reference herein in their entireties.

BACKGROUND OF THE INVENTION

1. Field of the Invention

This invention relates broadly to computer-implemented financial analysis. More particularly, this invention relates to computer-implemented financial analysis methodologies for determining the profitability and the present value of an investment or entity over an investment period as well as products and systems based thereon.

2. State of the Art

In business, people often are confronted with the evaluation of the impact of an economic investment, which is a series of forecasted actions and events that produce and/or sell goods or services over a predetermined investment period. Such an economic investment can be part of an investment plan or an annual budget. In order to evaluate the economic investment, a financial analyst (or a group of analysts) typically identifies and budgets incidents with respect to involved activities/departments (e.g., sales, production, expenses, purchases, payroll, collections, payments, etc). The incident values are used to calculate the profit and loss of the investment over the investment period. A net present value result is calculated based upon individual cash flow collections and payments. This net present value result provides a single monetary figure that characterizes whether the expected monies generated by the investment over the investment period will exceed the monies that are required to be paid out during the investment period. In this manner, the net present value result provides meaningful information that is often used as an important point in deciding whether or not the investment should be made.

Typically, the net present value result is derived by modeling the investment as a sequence of positive and negative cash collections. The cash collections (positive values) and payments (negative values) are discounted into their equivalents as of the date of the beginning of the investment, after taking into consideration the appropriate discount rate. That is to say in simple terms, if an annual interest rate of 10% is assumed, then the possession on Jan. 1, 2006 of a sum of 100 EUR is equivalent with the future collection of a sum of 105 EUR after 6 months. With this method, all cash collections and payments are discounted into net present values, and in the end they are added up. If the result is positive, the investment is profitable, while if it is negative it is a loss maker.

The general mathematical formula that is used to discount a future cash flow to its net present value is the following: the future cash flow is divided with a factor, which is the number 1 plus the interest rate of interest bearing period, but only after the factor is raised to the v power, where v is the total number of interest bearing periods. The result of that division is the net present value of the cash flow.

Such prior art net present value methodologies have significant limitations. First, implementation of the methodology is exceptionally difficult for complex investments that produce a large number of financial incidents over numerous dates. Second, the methodology is by its own nature exceptionally inaccurate, because situations with distinct differences are handled in the same manner. Moreover, there are often real and usual (even daily) situations for which it cannot give a suitable answer because of the inaccuracies built into the method. Finally, the method is incapable of generating a suitable answer for large investments because of the inaccuracies built into the method.

For example, the following real-life scenarios depict limitations of the prior art methodologies.

1. As a consequence of the multiple daily collections and payments, it is possible that for some days of the month the investment's bank account will have a negative cash balance and accordingly produce an interest expense (typically at a 6% interest rate for current lending rates), while certain other days of the month the investment's bank account will have a positive cash balance and accordingly produce interest income (typically at a 0.5% interest rate for current bank rates). The prior art methodologies are unable to and fail to determine daily bank account cash balances and thus are unable to determine if and when to apply such interest payments and interest credits. Such inabilities limit the accuracy of the underlying net present value calculation and analysis.
2. Similarly, under certain circumstances such as when the accounting balance (and not the valeur balance) is negative for the last calendar date of a given month, an additional tax contribution may be due by applicable tax statutes (e.g., the Greek Tax Law 128/75). Such tax contributions constitute a cash flow (expense). The prior art methodologies do not account for such tax contributions, which limit the accuracy of the underlying net present value calculation and analysis.
3. Similarly, from the interest income note in 1 above, there is a withholding of income tax from the bank at the date of interest calculation (a negative cash flow). Such income tax withholding is typically offset to a later date for year end tax calculations. The prior art methodologies do not account for such interest income and the tax consequences associated therewith, which limit the accuracy of the underlying net present value calculation and analysis.
4. The yearly net income of the investment is typically allocated into categories including a reserve fund, distributed dividends and retained earnings. The reserve fund carries over from year to year. Similarly, the retained earnings carry over into the following year and can be used for capital expenditures or other needs. The reserve fund and retained earnings remain in the entity. Thus, these accounts can affect the interest expense and/or interest income of the investment. Until their date of payment, distributed dividends can also affect the interest expense and/or interest income of the investment. The prior art methodologies do not account for such net income allocation and the interest credits and expenses associated therewith, which limit the accuracy of the underlying net present value calculation and analysis.
5. With regard to the monthly VAT payments, it is possible for a negative payment amount to be calculated in certain months, which means that negative payment is going to be carried forward in next month's payment, with financially beneficial results for the entity. The prior art methodologies do not account for such monthly VAT payments and the financial benefits associated therewith, which limit the accuracy of the underlying net present value calculation and analysis.

Thus, there remains a need in the art for improved financial analysis methodologies and tools that evaluate economic investments in a manner that is suitable for complex investments and in a manner that provides accurate results over a wide range of investments including complex and large investments.

SUMMARY OF THE INVENTION

It is therefore an object of the invention to provide a financial analysis methodology (and a tool based thereon) that evaluates an economic investment in a manner that is suitable for complex investments.

It is another object of the invention to provide such a financial analysis methodology (and a tool based thereon) that provides accurate results over a wide range of investments, including complex and large investments.

It is a further object of the invention to provide such a financial analysis methodology (and a tool based thereon) that accounts for daily calculations of a bank account, bank account interest payments and credits as well as bank account tax payments that may arise as the investment collects monies (e.g., calculated inflows) and pays monies (e.g., calculated outflows) over its investment period.

It is yet another object of the invention to provide such a financial analysis methodology (and a tool based thereon) that allows for allocation of the calculated net income into predetermined categories (e.g., distributed dividends, retained earnings, reserve fund), wherein certain categories (e.g., distributed dividends) contribute to the net present value of the investment and other categories (e.g., retained earnings, reserve fund) do not contribute to the net present value of the investment over certain parts of the investment period but contribute later.

It is also an object of the invention to provide such a financial analysis methodology (and a tool based thereon) that accurately accounts for value-added tax payments (and other tax payments) paid by the investment over the investment period.

It is still another object of the invention to provide such a financial analysis methodology (and a tool based thereon) that accurately accounts for calculated income taxes paid over the investment period.

In accord with these objects, which will be discussed in detail below, a computer-implemented method and corresponding tool includes software-based functionality that characterizes whether the expected net present value of monies generated by an investment over an investment period will exceed the net present value of monies that are required to be paid out during the investment period. Such software-based functionality derives and stores forecasted and calculated inflows and forecasted and calculated outflows over the investment period.

In the preferred embodiment of the invention, the calculated inflows are derived from one or more of the following: i) forecasted sales of the investment over the investment period, ii) calculated bank account interest credits of the investment that are to be collected over the investment period, and possibly iii) other forecasted and/or calculated inflows of the investment that are to be collected over the investment period. The calculated outflows are derived from one or more of the following: i) forecasted and/or calculated incidents (e.g., inventory costs, labor cost, overhead) related to costs of goods or services sold of the investment over the investment period, ii) forecasted and/or calculated expenses of the investment over the investment period, iii) forecasted and/or calculated depreciation of fixed assets of the investment over the investment period, iv) calculated value-added tax payments of the investment that are to be paid over the investment period, v) calculated income tax payments of the investment that are to be paid over the investment period, vi) calculated bank account interest debits of the investment that are to be paid over the investment period, vii) calculated bank account tax payments of the investment that are to be paid over the investment period, and possibly viii) other forecasted and/or calculated outflows of the investment that are to be paid over the investment period. The functionality processes the forecasted and/or calculated inflows and the forecasted and/or calculated outflows to derive a net income for each fiscal year in the investment period. An allocation rule is used to apportion the net income for each given fiscal year to predefined accounts. Such predefined accounts may include distributed dividends, retained earnings, and possibly reserves. The distributed dividends represent a portion of the profits of the investment that is shared by the investor(s) for the given fiscal year. Retained earnings represent a portion of the profits of the investment that is kept for future use or investment. Reserves represent a portion of the profits of the investment that must be reserved as dictated by statutory regulations or possibly other rules. The net income portions that are allocated to certain accounts (e.g., net income allocated to distributed dividends) for each given fiscal year over the investment period and possibly the value of other items that exist at the end of the investment period are discounted to their net present value as of the starting date of the investment. This first net present value result is used to evaluate the investment.

A comparison can be made between the first net present value result and a second net present value result characterizing the money payments (or possibly other items) that will be paid/contributed to the investment over the investment period by the investor or investing entity. This comparison can be realized by subtracting the second net present value from the first net present value and outputting (e.g., by display or by a printed report) the result to the user. If the result is positive, the investment is profitable, while if it is negative it is a loss maker. The magnitude of the result characterizes the amount of forecasted profit (or loss) of the investment over the investment period.

In accordance with the present invention, the computer-implemented method and corresponding tool employs primary entries and associated impact groups as data structures that represent financial outflows and inflows over the investment period. During a calculation phase, the primary entries are processed to generate data the represents such financial inflows and outflows in a form suitable for discounting into a net present value. Distribution factors can be used to allocate the value of the primary entry over corresponding user-defined budgeting periods. Annual entries can be defined and allocated during the calculation phase into corresponding primary entries. Calculations pertaining to conditional inflows and outflows can also be carried out in the calculation phase. In addition, rules-based logic can be used to adjust dates pertaining to the inflows and outflows (such as shifting days ahead in manner that accommodates for non working days). The user can apply variation factors to numeric values used in the calculation phase. Such variation factors permit the methodology and tool to quickly and conveniently model scenarios that affect a primary entry or item or other calculation.

In another aspect of the invention, the data generated by the computer-implemented method can be password protected by a user and forwarded on to other user(s). In the protected state or mode, the other user(s) can manipulate the data by a set of permitted actions, while another set of actions are not permitted to be carried out by the other user(s).

Additional objects and advantages of the invention will become apparent to those skilled in the art upon reference to the detailed description taken in conjunction with the provided figures.

BRIEF DESCRIPTION OF THE DRAWINGS

FIG. 11 illustrates an example of the adjustments made through the use of methodology of FIGS. 7 and 8 as applied to days of analytical lines that are derived from a primary entry in accordance with the present invention.

DETAILED DESCRIPTION OF THE PREFERRED EMBODIMENTS

Figure 1A:
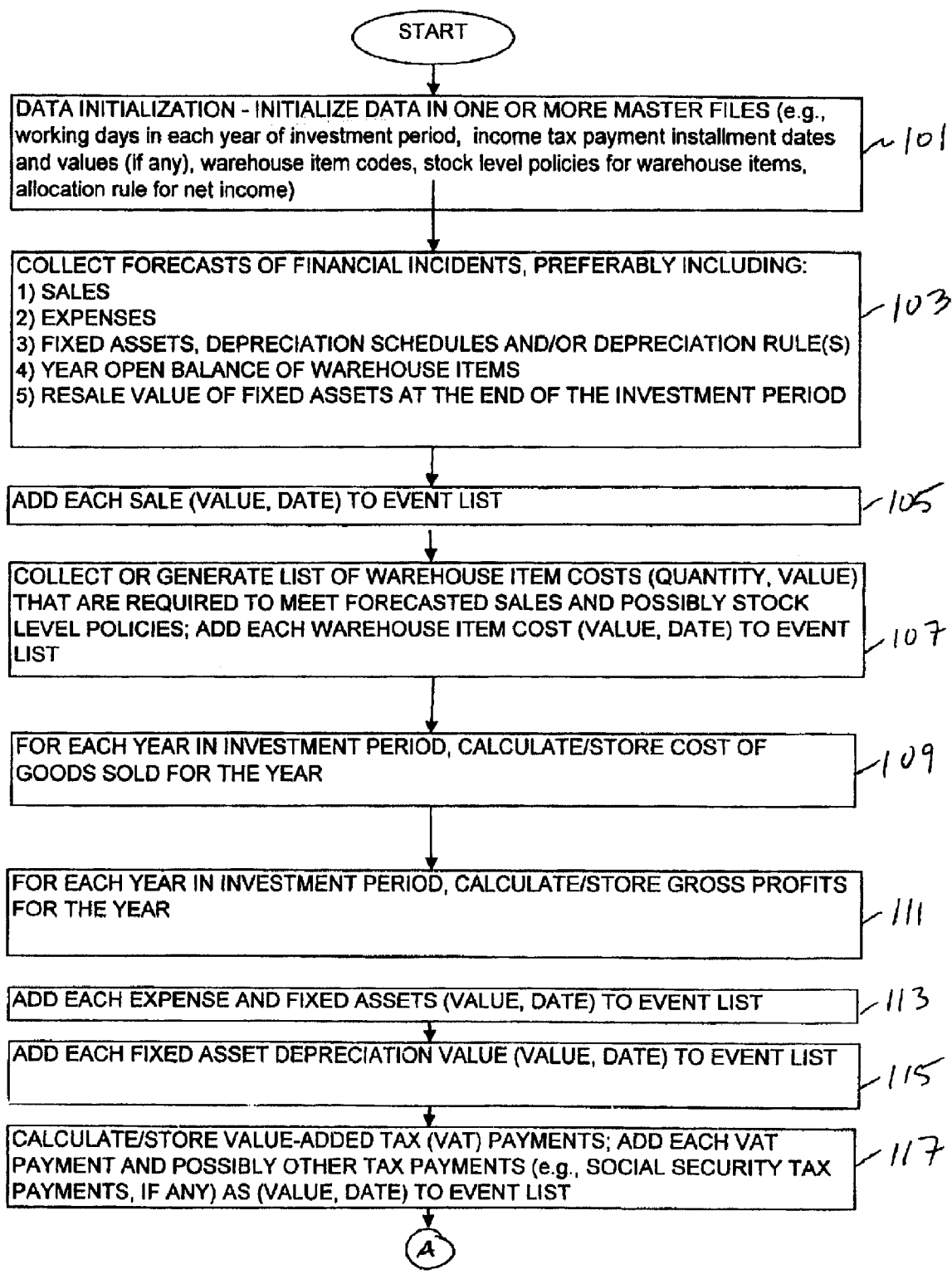
FIGS. 1A-1C, collectively, is a flow chart of a computer-implemented methodology for evaluating an investment in accordance with the present invention.
Figure 1B:
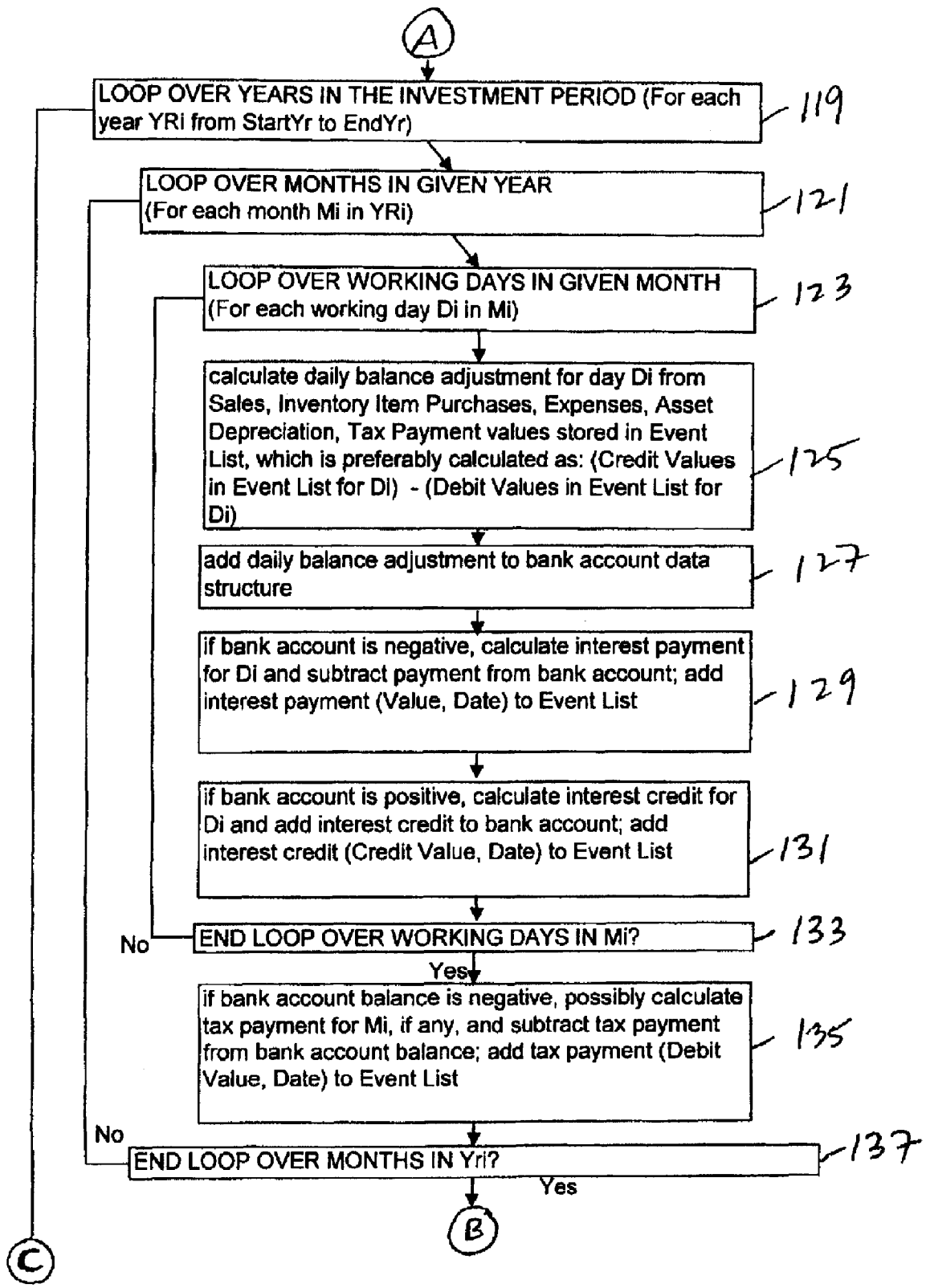
Figure 1C:
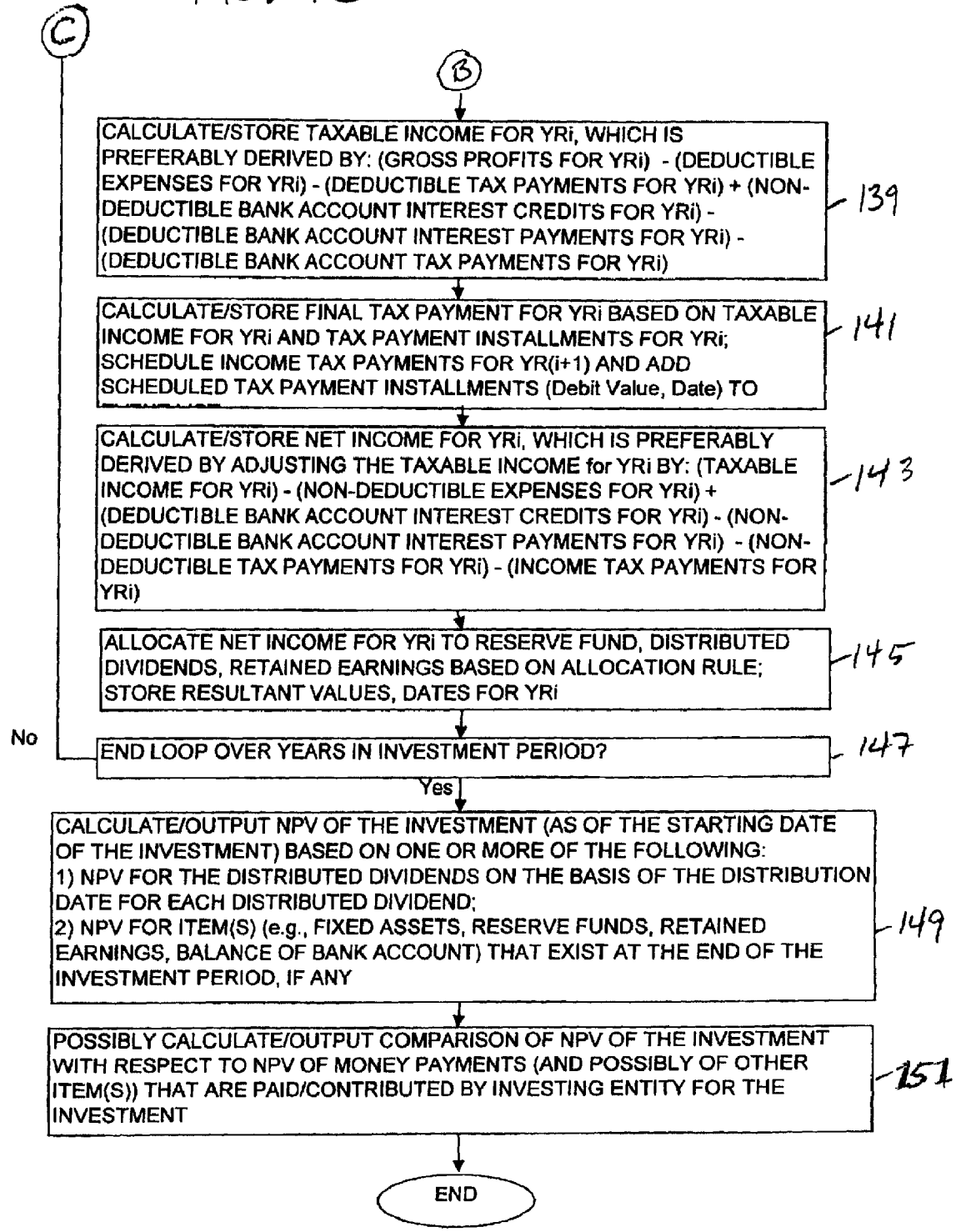
Figure 1D:
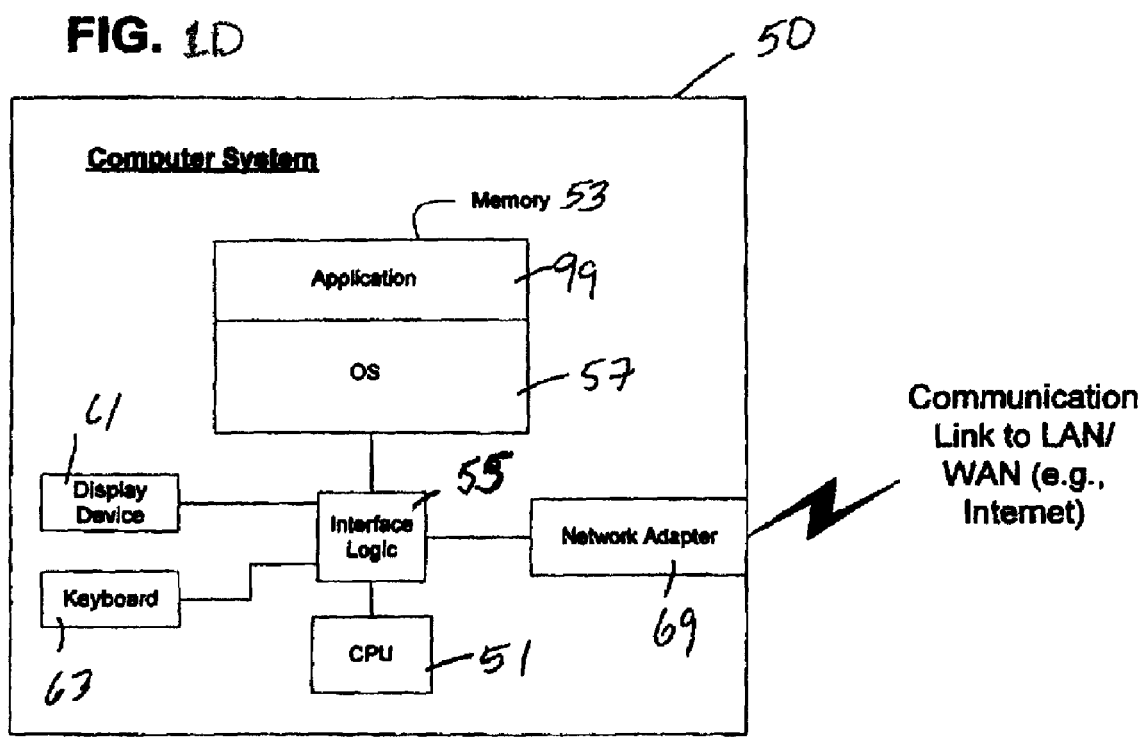
FIG. 1D is a functional block diagram of an exemplary computer processing system in which the present invention can be embodied.

Turning now to FIG. 1D, there is shown an exemplary computer system that can be used to execute the computer-implemented financial analysis methodologies of the present invention as described herein. The computer system can be any of a number of computer devices including a personal computer, laptop, workstation, server and the like. The computer system includes a central processor unit 51 that is interfaced to memory 53 by interface logic 55. The memory 53, which is typically realized by persistent memory (such as one or more ROM memory modules and/or one or more flash memory modules) as well as non-persistent memory (such as one or more DRAM modules), stores an operating system 57 as well as an application 99, which is referred to below as the "investment evaluation application". The central processor unit 51 also interfaces to a display device 61 (e.g., a liquid crystal display panel), a keypad or keyboard 63 and/or other user input device (e.g., a touch screen disposed on the display device 61) and possibly other devices (e.g., a microphone for voice input and one or more speakers for voice/audio output. The central processor unit 51 may also interface to a communication subsystem 69 that provides for bidirectional communication with a communication network (e.g., a local area network and/or a wide area network, such as the Internet). The operating system 57 and the investment evaluation application 99 are typically stored in a storage device, such as magnetic disk drive or disk array (not shown), and loaded into memory 53 as needed. The investment evaluation application 99 may also be stored on a program storage device (e.g., an optical storage disk such as a CD-ROM or DVD) and loaded/installed onto the storage device of the computer system 50 via an optical disk drive or the like. The investment evaluation application 99 may also be stored on a remote computer and loaded/installed onto the storage device of the computer system 50 via the communication network (e.g., downloaded over the Internet).

The investment evaluation application 99 includes software-based functionality that characterizes whether the expected net present value of monies generated by an investment over an investment period will exceed the net present value of monies that are required to be paid out during the investment period. Such software-based functionality calculates and stores forecasted and/or calculated inflows and forecasted and/or calculated outflows over the investment period. The inflows and outflows are stored and managed in one or more computer data structures stored on the computer system 50 or accessible therefrom. Such data structures can be one or more data files, one or more data tables stored as part of a relational database, or any other data structure used to persistently store data. The forecasted and/or calculated inflows are derived from one or more of the following: i) forecasted sales of the investment over the investment period, ii) calculated bank account interest credits of the investment that are to be collected over the investment period, and possibly iii) other forecasted and/or calculated inflows of the investment that are to be collected over the investment period. The forecasted and/or calculated outflows are derived from one or more of the following: i) forecasted and/or calculated incidents (e.g., inventory costs, labor cost, overhead) related to costs of goods or services sold of the investment over the investment period, ii) forecasted and/or calculated expenses of the investment over the investment period, iii) forecasted and/or calculated depreciation of fixed assets of the investment over the investment period, iv) calculated value-added tax payments of the investment that are to be paid over the investment period, v) calculated income tax payments of the investment that are to be paid over the investment period, vi) calculated bank account interest payments of the investment that are to be paid over the investment period, vii) calculated bank account tax payments of the investment that are to be paid over the investment period, and possibly viii) other forecasted and/or calculated outflows of the investment that are to be paid over the investment period. The application 99 processes the forecasted and/or calculated inflows and the forecasted and/or calculated outflows to derive a calculated net income for each fiscal year in the investment period. An allocation rule is used to apportion the calculated net income for each given fiscal year to predefined accounts. Such predefined accounts may include distributed dividends, retained earnings, and possibly reserves. The distributed dividends represent a portion of the profits of the investment that is shared by the investor(s) for the given fiscal year. Retained earnings represent a portion of the profits of the investment that is kept for future use or investment. Reserves represent a portion of the profits of the investment that must be reserved as dictated by statutory regulations or possibly other rules. The net income portions that are allocated to certain accounts (e.g., net income allocated to distributed dividends) for each given fiscal year over the investment period and possibly the value of other items that exist at the end of the investment period are discounted to their net present value as of the starting date of the investment. This first net present value result is used to evaluate the investment.

In the preferred embodiment, a comparison is made between the first net present value result and a second net present value result characterizing the money payments (or possibly other items) that will be paid/contributed to the investment over the investment period. This comparison can be realized by subtracting the second net present value from the first net present value and outputting (e.g., by display or by a printed report) the result to the user. If the result is positive, the investment is profitable, while if it is negative it is a loss maker. The magnitude of the result characterizes the amount of forecasted profit (or loss) of the investment over the investment period.

In the preferred embodiment, the software-based functionality of the investment evaluation application 99 embodies the methodology shown in FIGS. 1A through 1C and described below in more detail. The methodology begins in block 101 wherein the data stored in one or more master files is initialized. The one or more master files store necessary data that is used in the operations of the application 99, such as data identifying the working days in each fiscal year of the investment period, income tax payment installment dates and values, item codes for stock materials and other warehouse items used in manufacturing, stock level policies for the warehouse items which define the respective quantity levels of the warehouse items that trigger restocking and the corresponding restocking quantity and possibly other inventory information, data that defines the allocation rule for net income as described herein, and/or possibly other data. Such data can be initially set to a default value and updated by user input, or can be set to a predefined value by design.

In block 103, the operations collect forecasts of financial incidents relevant to the investment or entity (e.g., forecasted sales, forecasted expenses, fixed assets for the investment, depreciation schedules or rule(s) for the fixed assets, stock materials and other warehouse items for production and other information related thereto, etc). Such collection can be accomplished by a graphical user interface providing for user input, by batch loading of such data from a file, or by other suitable means.

In block 105, a value and date for each forecasted sale as defined by the data stored in block 103 is added to an event list. For instances where VAT taxes are applicable, the value added tax collected as part of the sale could be calculated and included in the value of the forecasted sale. For example, consider a value added tax of 9% for an item sold for 100 EUR. The VAT tax would be (100*0.09) EUR=9 EUR, and the value for the sale of the item would be (100+9) EUR=109 EUR.

For manufacturing-type investments and entities, optional block 107 may be carried out to collect or generate a list of warehouse item costs (e.g., raw material costs), associated direct labor costs and associated overhead costs that are required to meet the forecasted sales incidents as defined by the data stored in block 103. In the preferred embodiment, the required warehouse item costs also satisfy constraints that are dictated by the stock level policies of the master file as initialized in block 101. The warehouse item costs, direct labor costs and overhead costs are then added as values and dates to the event list.

The operations of block 107 can be adapted for different types of investments. For example, service-type investments or entities typically do not manufacture a product and thus the financial analysis typically does not involve forecasted warehouse items. In such instances, the operations of block 107 can be adapted to collect and store forecasted labor costs and forecasted overhead costs over the fiscal years of the investment. Similarly, merchandizing-type investments or entities typically do not manufacture a product and thus the financial analysis typically does not involve warehouse items. In these instances, the operations of block 107 can be adapted to collect and store stock purchase costs over the fiscal years of the investment period.

In block 109, the operations calculate a costs of goods sold value for each fiscal year of the investment period. For manufacturing-type investments and entities, the cost of goods sold for a given fiscal year is preferably derived from the data derived and stored in block 107 as follows:

(value of the warehouse item inventory at the start of the given fiscal year)+(calculated warehouse item costs for the given fiscal year)−(value of the warehouse item inventory at the close of the given fiscal year)+(forecasted labor costs for the given fiscal year)+(forecasted overhead costs for the given fiscal year).

Other cost of goods calculations can be used as well. For example, works in progress inventory and finished product inventory can be modeled throughout the fiscal year and valued as part of the costs of goods calculation. For service-type investments or entities, the costs of goods sold becomes costs of service sold, which is typically calculated by adding the labor costs for the given fiscal year to the overhead costs for the given fiscal year. For merchandizing-type investments or entities, the cost of goods sold is typically derived by adding the following:

(value of the stock inventory at the start of the given fiscal year)+(calculated stock purchase costs for the given fiscal year)−(value of the stock inventory at the close of the given fiscal year).

Other costs of goods sold calculations can be used as well.

In block 111, the operations calculate gross profits for each fiscal year of the investment period. In the preferred embodiment, the gross profits for a given fiscal year is derived as follows:

(forecasted sales for the fiscal year)−(costs of goods sold for the fiscal year as calculated in block 109).

Other gross profit calculations can be used as well.

In block 113, a value and date for each forecasted expense as defined by the data stored in block 103 is added to the event list.

In block 115, depreciation values and dates for each fixed asset as defined by the data stored in block 103 are generated and added to the event list. Preferably, the depreciation values and dates for the fixed assets of the investment are derived from a depreciation schedule or rule defined by the data stored in block 103.

In block 117, if applicable, VAT payment values and dates are calculated based upon the forecasted sales of the investment as defined by the data stored in block 103. Preferably, the VAT payment values are derived for each given sale by multiplying the sales price times a predetermined VAT percentage value (e.g., 9%). The date for a given VAT payment is preferably defined by the applicable tax statute (e.g., under the tax laws of Greece, VAT payments are due on the 25$^{th}$ of the month immediately following the invoice issue date). VAT values and dates are calculated based upon the forecasted and/or calculated purchases and expenses of the investment. Typically, a negative monthly VAT balance (payments−credits) is carried over into the next month. The VAT payments and credits (values and dates) are added to the event list. Other tax payments (e.g., social security payments) can also be added as values and dates to the event list.

In blocks 119 to 147, the operations perform a nested loop over the fiscal years, months and working days of the investment period. Blocks 123 to 133 define an inner loop that is performed for each working day of the investment period. Blocks 121 to 137 define an intermediate loop that is performed for each month of the investment period. And blocks 119 to 147 define an outer loop that is performed for each fiscal year of the investment period.

As part of this inner loop, block 125 calculates a daily balance adjustment based upon the sales, warehouse inventory purchases, expenses, fixed asset depreciation values, tax payments and possibly other values stored in the event list. Preferably, the daily balance adjustment is calculated for a given working day by subtracting the debit values of the event list for the given working day from the credit values of the event list for the given day. In block 127, a bank account balance is updated by adding the daily balance adjustment to the opening day's balance, which is carried forward from the previous day's closing balance. In block 129, it is determined whether the bank account balance for the given working day is negative. If so, a bank account interest payment is calculated for the given working day (preferably, by multiplying the bank account balance by a predetermined interest rate percentage as defined in block 101), the bank account interest payment is deducted from the bank account balance, and the bank account interest payment is added as a value and date to the event list. In block 131, it is determined whether the bank account balance for the given working day is positive. If so, a bank account interest credit is calculated for the given working day (preferably, by multiplying the bank account balance by another predetermined interest rate percentage as defined in block 101), the bank account interest credit is added to the bank account balance, and the bank account interest credit is added as a value and date to the event list. Other suitable calculations can be used as well. For example, similar bank account interest payment and credit calculations can be calculated on the month end bank account balance as part of the loop of blocks 121 to 137.

As part of the intermediate loop of blocks 121 to 137, block 135 determines whether the bank account balance at the end of a given month is negative. If so, a tax payment, under certain laws such as a 128/75 tax payment due under Greek law, may be due. In this case, the resulting tax payment is calculated (preferably, by multiplying the bank account balance for the given month by a predetermined tax rate as defined in block 101), the tax payment is deducted from the bank account balance on its proper date, and the tax payment is added as a value and date to the event list.

As part of the outer loop of blocks 119 to 147, block 139 calculates and stores the taxable income of the investment for the given fiscal year. This taxable income calculation is preferably derived as follows:

(Gross Profits for given fiscal year YRi)−(Deductible Expenses for YRi)−(Deductible Tax Payments for YRi)+(Non-Deductible Bank Account Interest Credits for YRi)−(Deductible Bank Account Interest Payments for YRi)−(Deductible Bank Account Tax Payments for YRi)

Other suitable calculations can be used as well.

In block 141, the final income tax payment for the given fiscal year is calculated and stored based upon the taxable income calculated in block 139. Preferably, the final income tax payment for the given fiscal year is calculated by subtracting the income tax installments paid in the given fiscal year from the taxable income calculated in block 139. The final income tax payment is added as a value and date to the event list. In addition, the income tax installments that are to be paid in the following fiscal year are calculated and stored (preferably, in accordance with a given rule such as a predetermined percentage of the taxable income paid in the given fiscal year). Such income tax installments are then added as values and dates to the event list.

In block 143, the net income for the given fiscal year is calculated preferably by adjusting the taxable income as derived in block 139 to reflect the total income tax paid for the given fiscal year as well as other non-deductible expenses and outflows and other deductible credits and inflows. Preferably, the net income for the given fiscal year is calculated as follows:

(Taxable Income for given fiscal year YRi)−(Non-Deductible Expenses For YRi)+(Deductible Bank Account Interest Credits For YRi)−(Non-Deductible Bank Account Interest Payments For YRi)−(Non-Deductible Tax Payments For YRi)−(Income Tax Payments For YRi)

Other suitable net income calculations can be used as well.

In block 145, the net income as calculated in block 143 is allocated to predefined accounts in accordance with an allocation rule defined in block 101. The value of each account for the given fiscal year is updated, if necessary, and stored. In the preferred embodiment, such predefined accounts include distributed dividends, retained earnings, and possibly reserves as described above.

After completing the outer loop, the operations continue to block 149 to calculate a first net present value for the investment. Preferably, the first net present value is based on the net income portions that are allocated to certain accounts (e.g., net income allocated to distributed dividends) over the investment period in block 145, possibly the value of other items (fixed assets, reserve fund, retained earnings, bank account balance) that exist at the end of the investment period, and possibly the value of other derivative cash flows (payment of income tax and payment of dividends or other collections and/or payments) that remain to take place after the investment period. In particular, each one of these values is discounted to its net present value as of the starting date of the investment and added together to store a resultant sum, which is the first net present value. This first net present value result is preferably output to the user (e.g., via display or printed report) for use in evaluating the investment.

Finally, in block 151, a comparison is made between the first net present value result of block 149 and a second net present result characterizing the money payments (or possibly other items) that will be paid/contributed to the investment over the investment period. In particular, each one of these money payments or other items is discounted to its net present value as of the starting date of the investment and added together to store a resultant sum, which is the second net present value. The comparison of block 151 is preferably realized by subtracting the second net present value from the first net present value and outputting (e.g., by display or by a printed report) the result to the user. If the result is positive, the investment is profitable, while if it is negative it is a loss maker. The magnitude of the result characterizes the amount of profit (or loss) of the investment over the investment period.

The operations of FIGS. 1A-1C as described above can be realized by a wide variety of programming environments, languages and/or data constructs. An exemplary description of the application written in TURBO BASIC is described in U.S. Ser. No. 11/279,259, incorporated by reference above in its entirety.

The computer-implemented investment evaluation application as described herein provides many important benefits, including, but not limited to:

i) accounting for bank account interest payments and credits as well as bank account tax payments that may arise as the investment collects monies (e.g., calculated inflows) and pays monies (e.g., calculated outflows) over the investment period;

ii) allowing for allocation of the calculated net income into predetermined categories (e.g., distributed dividends, retained earnings, reserve fund) wherein certain categories (e.g., distributed dividends) contribute to the net present value of the investment and other categories (e.g., retained earnings, reserve fund) do not contribute to the net present value of the investment over certain parts of the investment period;

iii) accurately accounting for calculated income taxes paid over the investment period; and iv) accurately accounting for value-added tax payments paid by the investment over the investment period.

These benefits provide a greater degree of accuracy in modeling the finances of the investment over the investment period and thus provide decision makers with accurate information that can be effectively used to determine whether or not to make the investment.

In accordance with the present invention, the above described evaluation application and methodologies can include several additional modifications to provide user customization, user convenience, and additional information to the user, and/or to improve accuracy of the results. In an exemplary embodiment, the software-based functionality of the investment evaluation application embodies the methodology shown in FIG. 2.

Figure 2:
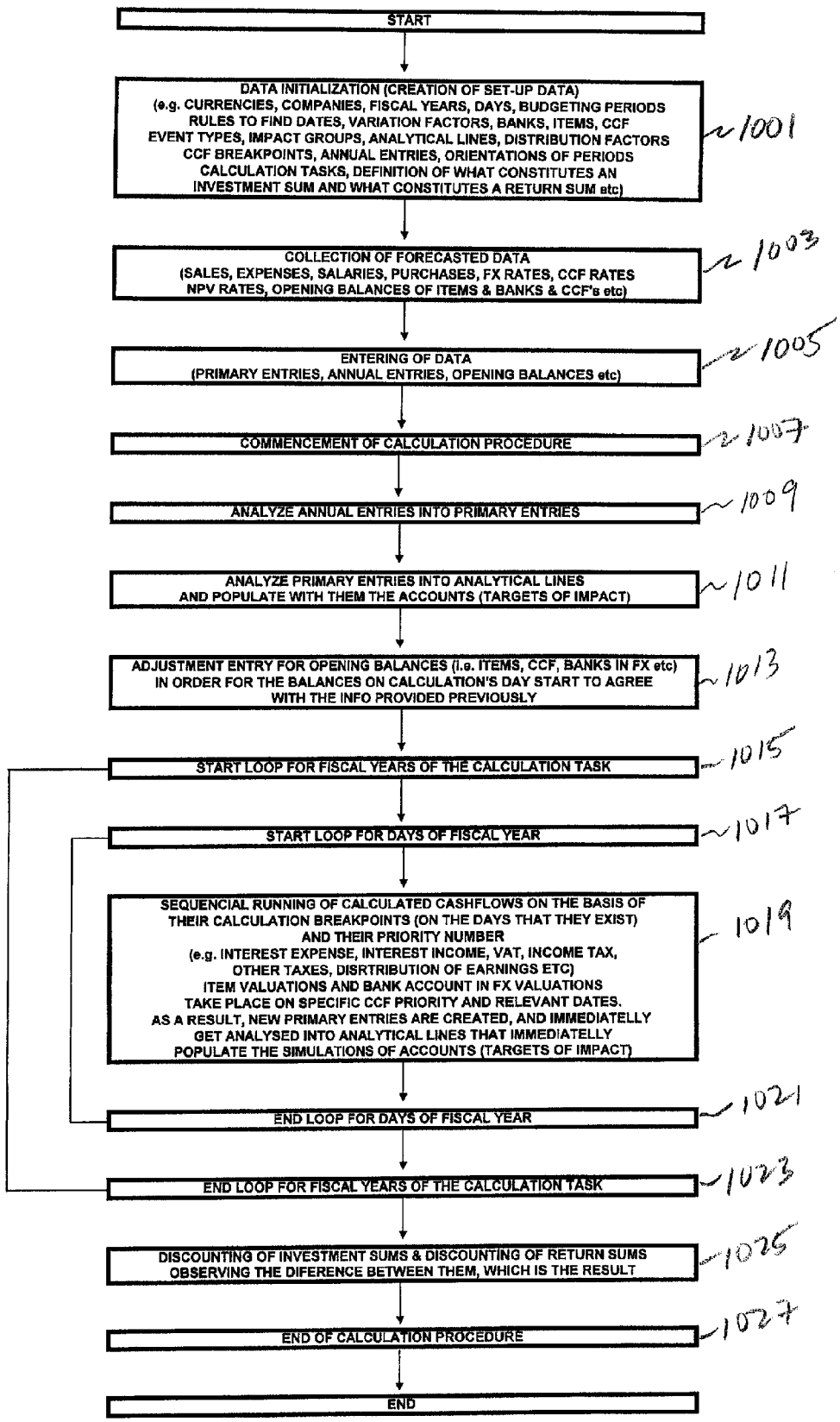
FIG. 2 is a flow chart of a computer-implemented methodology for evaluating an investment in accordance with the present invention.

The methodology of FIG. 2 begins in block 1001 wherein data used in the operations of the application is initialized. Such data can define currencies, companies, fiscal year, days, budgeting periods (such as budget weeks, budget months, budget quarters, etc), impact groups as described below, event types as below, parameters related to rules to find dates as described below, variation factors as described below, accounts related to the investment, items related to the investments (item codes for stock materials and other warehouse items used in manufacturing, stock level policies for the warehouse items which define the respective quantity levels of the warehouse items that trigger restocking and the corresponding restocking quantity and possibly other inventory information), parameters related to CCF processing as described below, orientation periods, data that defines the allocation rule for net income as described below, and/or possibly other data. Such data can be initially set to a default value and updated by user input, or can be set to a predefined value by design.

In block 1003, the operations collect forecasts of financial incidents relevant to the investment or entity (e.g., forecasted sales, forecasted expenses, forecasted salaries, fixed assets for the investment, depreciation schedules or rule(s) for the fixed assets, forecasted purchases such as stock materials and other warehouse items for production and other information related thereto, etc). The operations can also collect other forecasted data used in the analysis, such as foreign exchange rates, net-present value rates, etc. Such collection can be accomplished by a graphical user interface providing for user input, by batch loading of such data from a file, or by other suitable means.

In block 1005, a user defines a set of primary entries and possibly a set of annual entries and/or opening balances for use in the analysis. The primary entries and annual entries represent financial inflows and outflows over the investment period as described below. Data representing such primary entries, annual entries and/or opening balances is stored by the application. The primary entries and annual entries defined in block 1005 can represent forecasted sales, forecasted expenses (e.g., salaries, advertising and other marketing costs, rent, utilities, lawyer's fees, other expenses), fixed asset values, depreciation of fixed assets or other forecasted financial incidents for the investment over the investment period (steps 105, 113 and 115 of FIG. 1).

In block 1007, user input invokes a calculation procedure of blocks 1009 to 1027.

In block 1009, each annual entry defined in block 1005 is processed to derive a set of primary entries corresponding thereto as described below.

In block 1011, the primary entries defined in block 1005 (or generated in block 1009 from an annual entry) are processed to derive analytical lines corresponding thereto as described below. The analytical lines are grouped into accounts (targets of impact) as described below.

In block 1013, adjustments are made to opening balances (bank accounts, tax payments, items such as inventory) if need be. For example, it is contemplated that bank account balances, tax payment balances and inventory item balances will be carried over from year to year.

In blocks 1015-1023, an outer loop is performed over fiscal years of the investment.

In blocks 1017-1021, an inner loop is performed over the days of a given fiscal year dictated by the outer loop. In block 1019 of the inner loop, calculated cash flows are processed to derive financial outflow and inflows that are conditional in nature over the given fiscal year. The calculated cash flow processing is described below in more detail. The conditional financial outflows and inflows can include interest expense and interest credit calculations, tax payment calculations (e.g., VAT payments, income tax payments, other tax payments) as well as taxable income, net income and distribution of earnings (steps 117, 125-131, 135, and 139-145 of FIG. 1). The conditional financial outflows and inflows can also include inventory and other cost of goods calculations (e.g., item valuations, overhead costs and warehousing) as well as gross profit calculations (steps 107, 109 and 111 of FIG. 1). The result of the CCF processing generates primary entries and analytical lines for the appropriate accounts similar to those generated in blocks 1009 and 1011. The analytical lines are then grouped into accounts (targets of impact) as described below.

After completion of the outer loop of blocks 1015-1023, the operations continue to block 1025, wherein the financial outflows and inflows represented by the analytical lines grouped into targets of impact are discounted to calculate a first net present value for the investment (referred to as a "return value"). Similar to step 149 of FIG. 1, the return value is preferably based on the net income portions that are allocated to certain accounts (e.g., net income allocated to distributed dividends) over the investment period, possibly the value of other items (fixed assets, reserve fund, retained earnings, bank account balance) that exist at the end of the investment period, and possibly the value of other derivative cash flows (payment of income tax and payment of dividends or other collections and/or payments) that remain to take place after the investment period. In particular, each one of these values is discounted to its net present value as of the starting date of the investment and added together to store a resultant sum, which is the first net present value or return value. This return value is preferably output to the user (e.g., via display or printed report) for use in evaluating the investment.

As part of block 1027, a comparison can be made between the return value and a second net present result characterizing the money payments (or possibly other items) that will be paid/contributed to the investment over the investment period (referred to as "investment value"). Similar to step 151 of FIG. 1, the investment value is derived by discounting these money payments or other items to their respective net present values as of the starting date of the investment and adding the respective net present values together to store a resultant sum, which is the second net present value or investment value. The comparison of block 1027 is preferably realized by subtracting the investment value from the return value and outputting (e.g., by display or by a printed report) the result to the user. If the result is positive, the investment is profitable, while if it is negative it is a loss maker. The magnitude of the result characterizes the amount of profit (or loss) of the investment over the investment period.

After completing block 1025, the calculation procedure ends in block 1027.

Periods

Rather than assume the start and end dates of the periods of a fiscal year, a month, a week, or any other period of relevance in performing the evaluation according to the invention, such periods can be customized by the user. For example, the fiscal year can start on January 1 and end on December 31 of a same calendar year, or start on July 1 of a calendar year and end on June 30 of a subsequent calendar year, or have any other start and end dates (generally 365 days apart, but not necessarily) as set by the user.

In the preferred embodiment, the investment evaluation application as described herein includes that a graphical user interface that interacts with the user to specify the start date and end date for one or more budgeting periods that will be part of the analysis. The budgeting periods typically include one or more fiscal years, budget months within a fiscal year, and budget weeks within a fiscal year. The budgeting periods can be other arbitrary periods within a fiscal year. For example, periods of fiscal quarters with appropriate start and end dates. It is noted that budget months and budget weeks need not have start dates and ends dates that conform to calendar months or calendar weeks. For example, a budget week period may be set to have a first day as a Monday. If the fiscal year starts on a Thursday, there will be partial week periods in addition to 52 full week periods. The budgeting periods as defined by the user are preferably used to determine dates for the analytical lines that flow from an impact group as described below in more detail.

Figure 3A:
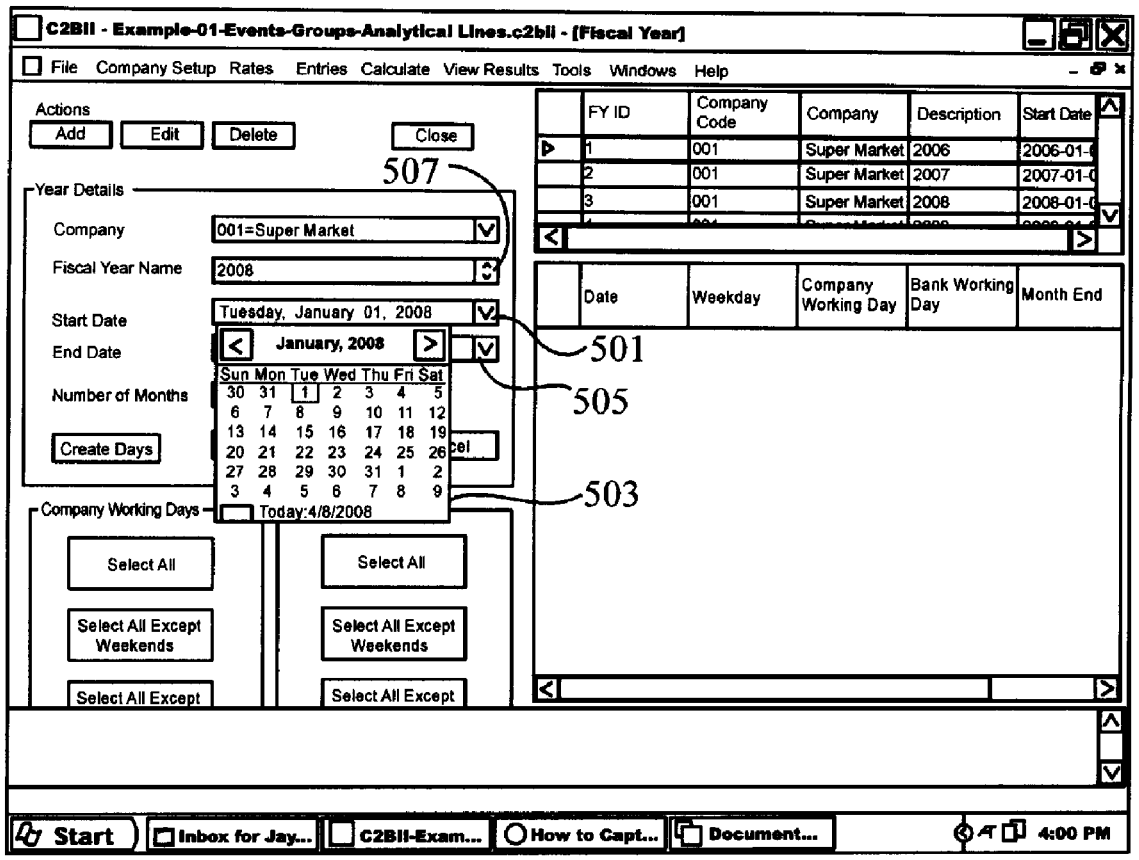
FIGS. 3A-3C are schematic illustrations of graphical user interfaces that enable a user to define relevant time periods (e.g., one or more fiscal years, budget months, budget weeks) as part of the computer implemented methodology for investment evaluation in accordance with the present invention.

A graphical user interface that interacts with the user to define a fiscal year is illustrated in FIG. 3A. The start date for the fiscal year is specified by user manipulation of a selector 501 that invokes a calendar interface 503 for scrolling through months and years to select a particular day. The end date for the fiscal year is specified by user manipulation of a selector 505 that invokes another calendar interface (not shown) for scrolling through months and years to select a particular day. The user also specifies the identifier for the fiscal year by manipulation of selector box 507.

Figure 3B:
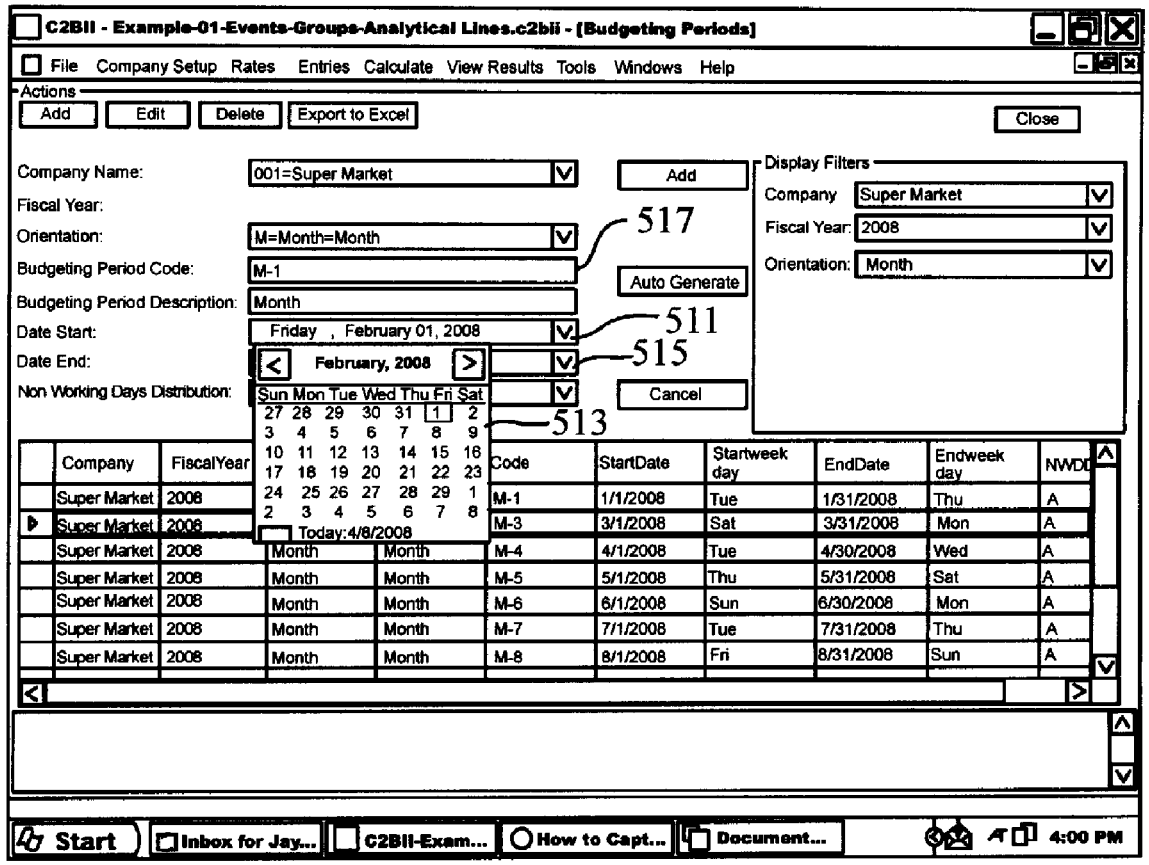

A graphical user interface that interacts with the user to specify the start date and end date for one or more budget months is illustrated in FIG. 3B. The start date for the budget month is specified by user manipulation of a selector 511 that invokes a calendar interface 513 for scrolling through months and years to select a particular day. The end date for the budget month is specified by user manipulation of a selector 515 that invokes another calendar interface (not shown) for scrolling through months and years to select a particular day. The user also specifies the identifier (code) for the budget month by entering the identifier into text box 517.

Figure 3C:
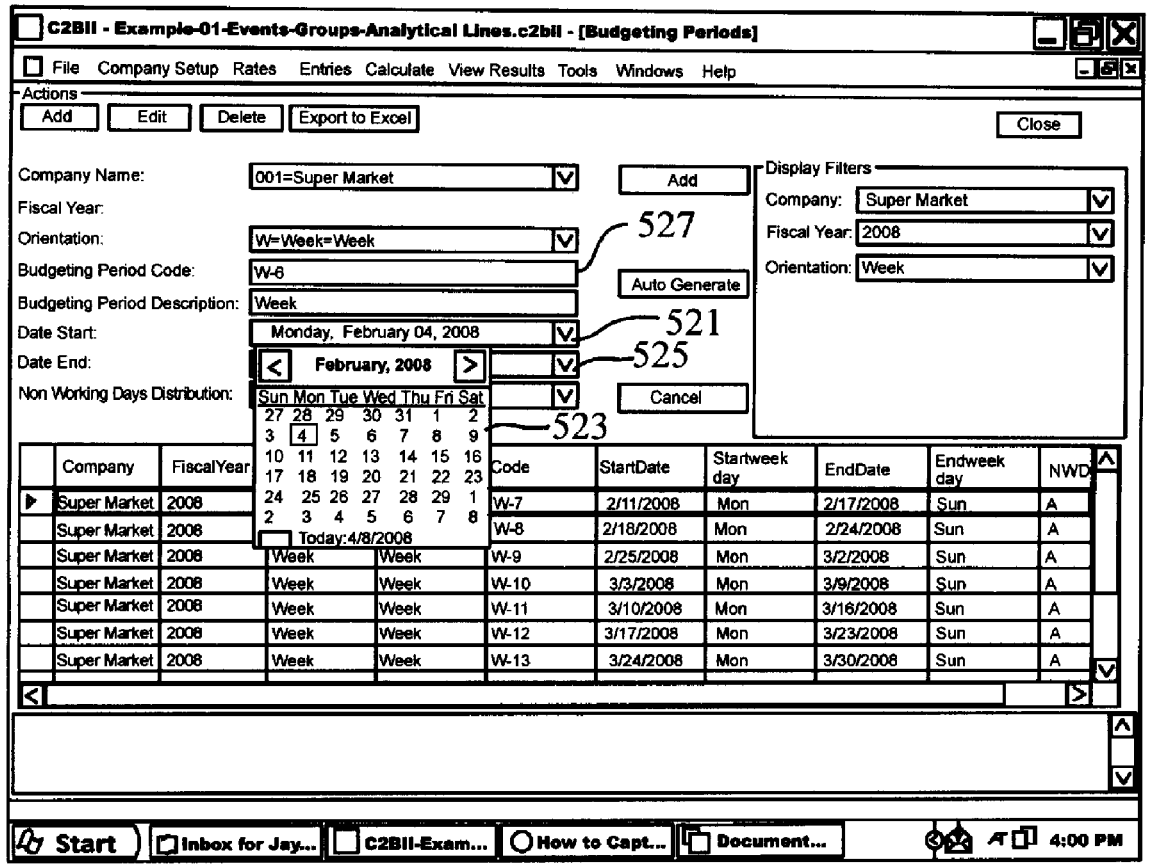

A graphical user interface that interacts with the user to specify the start date and end date for one or more budget weeks is illustrated in FIG. 3C. The start date for the budget week is specified by user manipulation of a selector 521 that invokes a calendar interface 523 for scrolling through months and years to select a particular day. The end date for the budget week is specified by user manipulation of a selector 525 that invokes another calendar interface (not shown) for scrolling through months and years to select a particular day. The user also specifies the identifier (code) for the week by entering the identifier into text box 527.

Figure 4A:
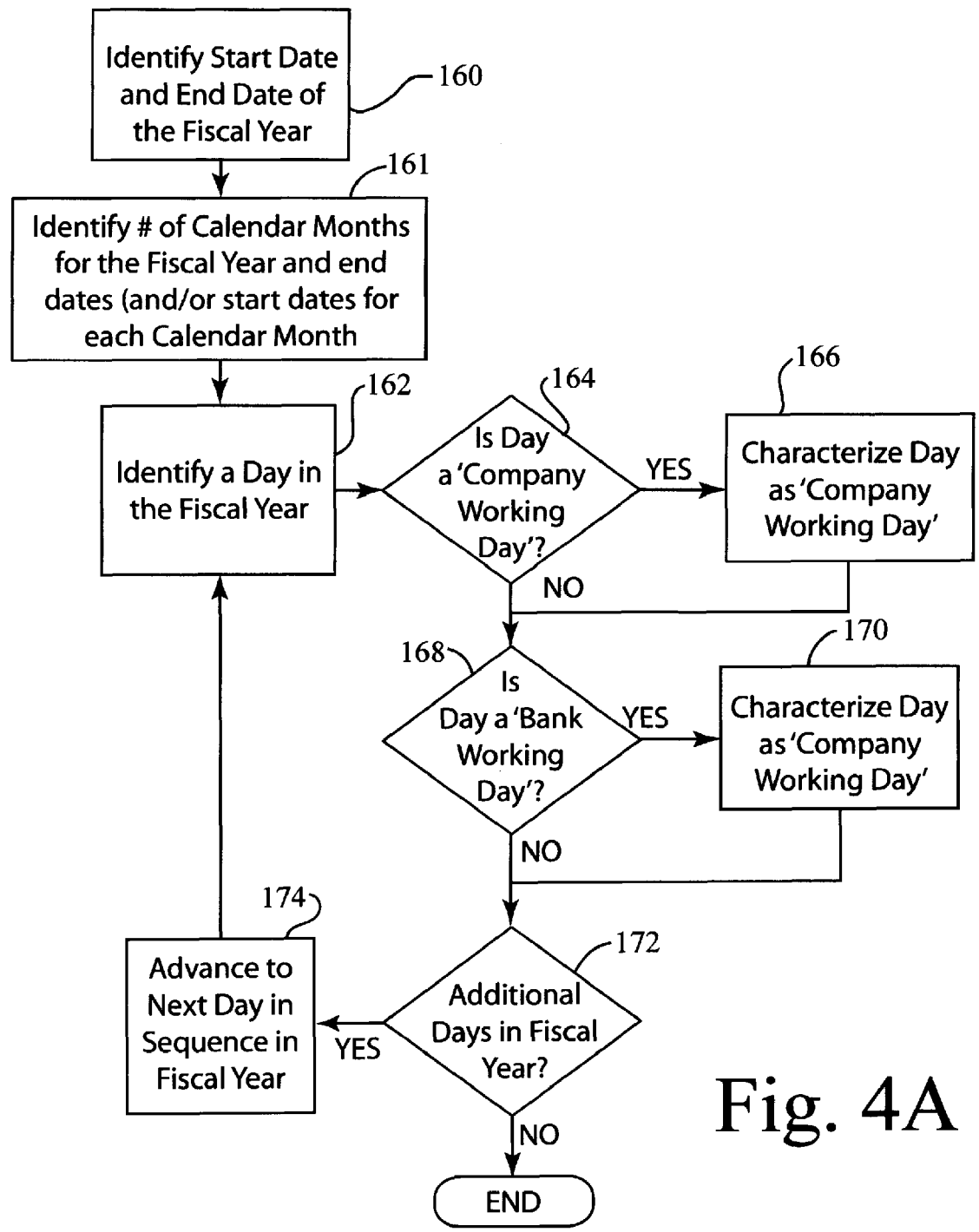
FIG. 4A is a flow chart of methodology to define months within a fiscal year as well as characterize days in the fiscal year as company working days or bank working days, which is part of the computer implemented methodology for investment evaluation in accordance with the present invention.

The investment evaluation application also preferably provides a graphical user interface that allows the user to define calendar months within the fiscal year(s) that are relevant to the analysis as well as characterize days within such fiscal year(s) as either "company working days", "bank working days," or both as appropriate. A preferred methodology for carrying out such operations is shown in FIG. 4A. At 160, the user identifies the start date and end date for a fiscal year. At 161, the user identifies the number of calendar months for the fiscal year of 160 as well as the end dates (and/or start dates) for such calendar months. At 162, the user selects a particular day within the fiscal year, and characterizes the selected day as either a "company working day" at 164, 166, a "bank working day" at 168, 170, or both, as appropriate. The characterization of the days at 162-170 continues for each day within the fiscal year by operations of 172 and 174.

Figure 4B:
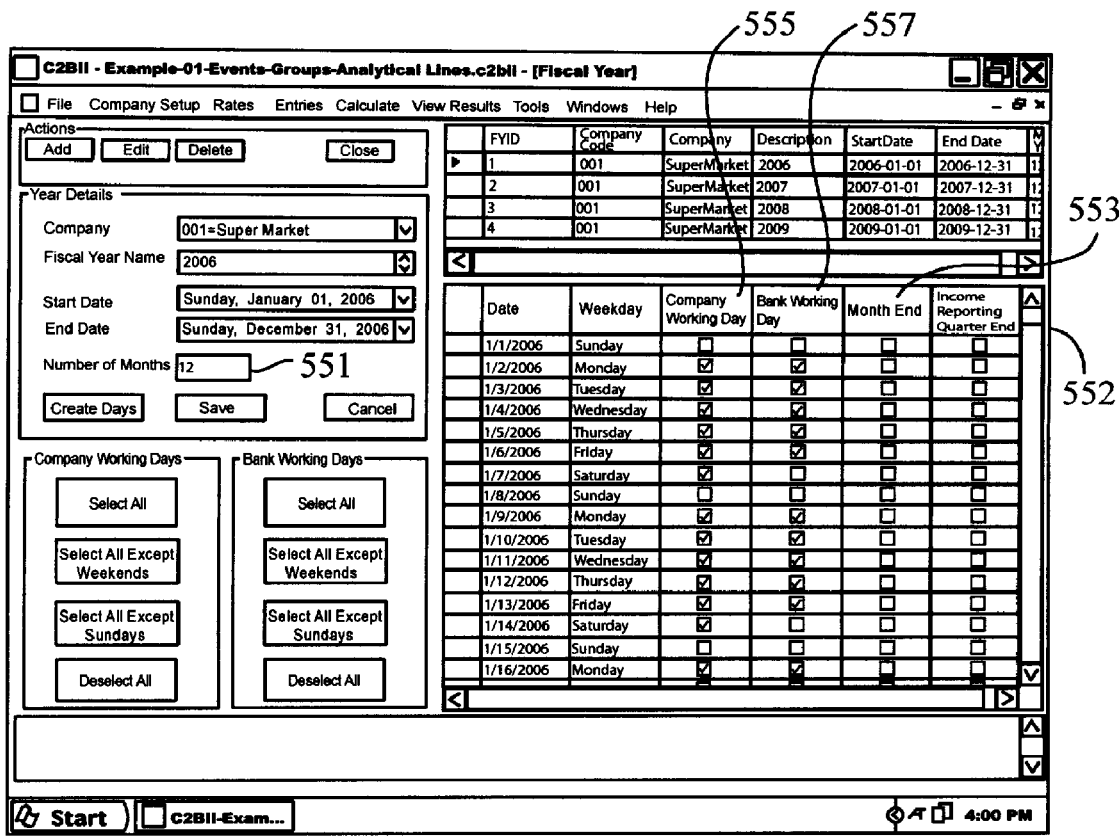
FIG. 4B is a schematic illustration of an exemplary graphical user interface for interacting with a user to carry out the operations of FIG. 4A.

FIG. 4B depicts an exemplary graphical user interface for interacting with a user to carry out the operations of FIG. 4A. The selector box 551 enables the user to identify the number of calendar months in the fiscal year. The days of the fiscal year are provided as rows in a table 552. The check boxes of column 553 of the table enable the user to identify the end dates of the calendar months of the fiscal year. The check boxes of column 555 and 557 enable the user to identify a particular day as a "company working day" and/or a "bank working day", respectively.

Note that the calendar months can preferably have any start and end dates as selected by the user as described above. For example, each calendar month period can start on the first day of a month and end on the last day of the respective month. Alternatively, each calendar month can or start and end at other dates as set by the user. The user-defined calendar months as well as the user-defined characterization of "company working days" and "bank working days" are preferably utilized to adjust the date for a given analytical line as part of the rules-to-find date logic as described below.

Primary Entries, Impact Groups, and Analytical Lines

Figure 5:
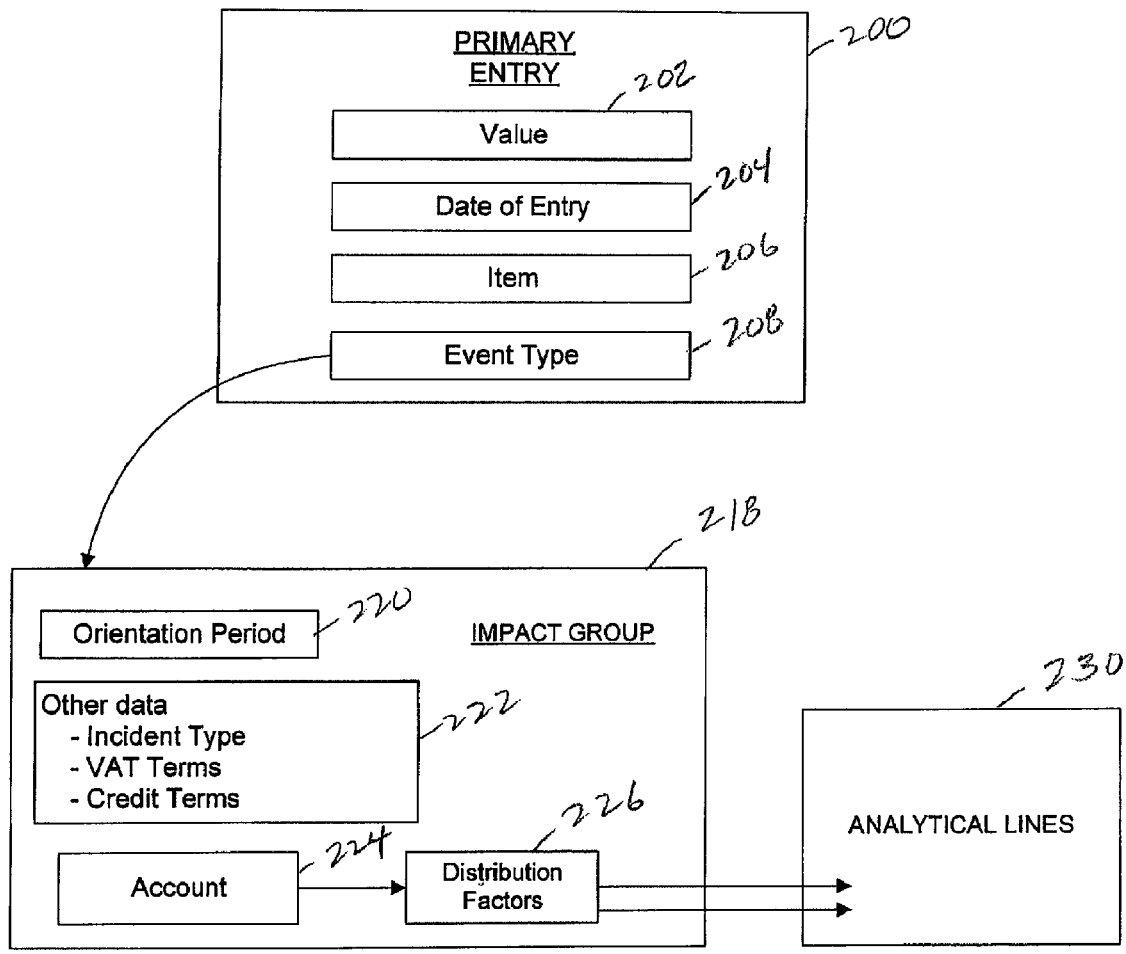
FIG. 5 is a schematic representation of the relation of primary entries, event type, impacts groups and analytical lines in accord with an embodiment of the invention.

The investment evaluation application as described herein preferably represents forecasted and/or calculated inflows as well as forecasted and/or calculated outflows over the investment period employing primary entries and impact groups. As depicted by the schematic diagram of FIG. 5, a primary entry 200 is a logical data structure that defines a value 202, a date of entry 204, an item identifier 206, and an event type 208. The value 202 represents a monetary value for the primary entry 200 and it can be defined by a single data field or by a calculation of multiple data fields (such as unit price·# of units sold). The date of entry 204 (and the orientation period 220 of the impact group 218 associated with the primary entry 200) defines a time period over which the value 202 of the primary entry 200 is to be allocated as will be described below. The item identifier 206 identifies one or more items associated with the primary entry 200 and can be employed to associate one or more accounts to the primary entry 200 as is described below. The event type 208 is a text field that can be used to identify the type of the primary entry. In this manner, the text field of the event type 208 can be shared across multiple primary entries that are similar to one another. The event type 208 of the primary entry 200 also associates the primary entry 200 with one or more impact groups 218 as described below. The primary entry 200 can include other data (such as currency type) that is used to derive the inflow and outflows represented by the primary entry 200. The other data can also include an identifier for the company associated with the primary entry, comments, etc.

The impact group 218 is a logic data structure that includes an orientation period 220 (e.g., year, month, week, quarter, etc), other data 222, an account 224, and a set of distribution factors 226. The date of entry 204 of the primary entry 200 associated with the impact group 218 (by the event type 208 of the primary entry) and the orientation period 220 of the impact group 218 defines a time period over which the value 202 of the primary entry 200 is to be allocated as will be described below. The distribution factors 226 of the impact group 218 includes one or more distribution factors that dictate the allocation of the value 202 of the primary entry 200 associated with impact group for the account 222 over this time period as described below in more detail The impact group 218 can also include other data 222, such as one or more of the following:
  data values (e.g., incident type, VAT Terms, Credit Terms) used to derive the analytical lines for the primary entry 200 and impact group 218;
  a percentage value which dictates a percentage of the value 202 of the primary entry 200 to allocate over the account 224 of the impact group 218 in accordance with the distribution factors 226 and the time period defined by the date of entry 204 and orientation period 220;
  an impact group type (e.g., income/sale type or expense/purchase type—these types can be used to select or derive an appropriate currency exchange rate if the monies are to be paid or collected in a foreign currency);
  an entry type (e.g., debit or credit type which dictates whether the analytical lines for the primary entry 200 and impact group 218 will be debit entries or credit entries for the account 224 of the impact group 218); and
  parameters for rules-to-find-date calculations as described below in more detail.

The investment evaluation application as described herein employs the primary entries 200 and associated impact groups 218 to define analytical lines 230 for the account 224 of the impact groups 218. The analytical lines of the account 224 are each defined by a date as well as a portion of the primary entry value for such date as dictated by the distribution factor for such date. The analytical lines for the accounts represent forecasted and/or calculated inflows as well as forecasted and/or calculated outflows over the investment period as described herein. The analytical lines can be group together to create accounts (referred to as "Targets of Impact") that simulate relevant information for the investment of interest. The grouping of analytical lines into the appropriate targets of impact is dictated by the account 224 of the impact group 218 from which the respective analytical line was derived. The targets of impact can include, for example, a bank account, calculated cash flow (CCF), profit and loss, etc.

In the preferred embodiment, the dates for the analytical lines that flow from a given primary entry 200 and given impact group 218 are derived from the date of entry 204 of the given primary entry 200 and the orientation period 220 of the given impact group 218 as follows. First, the application identifies a list of budgeting periods (fiscal years, budget months, budget weeks, other budget periods) that have the same orientation (fiscal year, month, week, other) as the orientation period 220 of the given impact group 218. From this list, the application selects the budgeting period whose duration includes the date of entry 204 of the given primary entry 200. The application then identifies the dates for the selected budgeting period as the dates for the analytical lines.

For example, consider a primary entry 200 for a supermarket store that includes a value 202 of $1,000,000 and a date of entry 204 of Jul. 15, 2008 related to the weekly sales of an item milk. Other data 210 includes a "sale" incident type 204, VAT Terms of 19% and Credit Terms of 60 days credit. The event type 208 is associated with an impact group 218 having an orientation period 220 of a week. The association of the primary entry 200 to the impact group 218 can be dictated by user input (or possibly by automatic means). The associated impact group 218 may differ depending on the various data values of the primary entry 200. For example, for a sale type event with VAT and credit terms, such sale occurring over one week, five impact groups 218 for the following accounts can be associated therewith: (i) bank by accounting, (ii) bank by valeur, (iii) calculated cash flow (CCF), (iv) item, and (v) profits and loss, each with an orientation period of a week.

Figure 6:
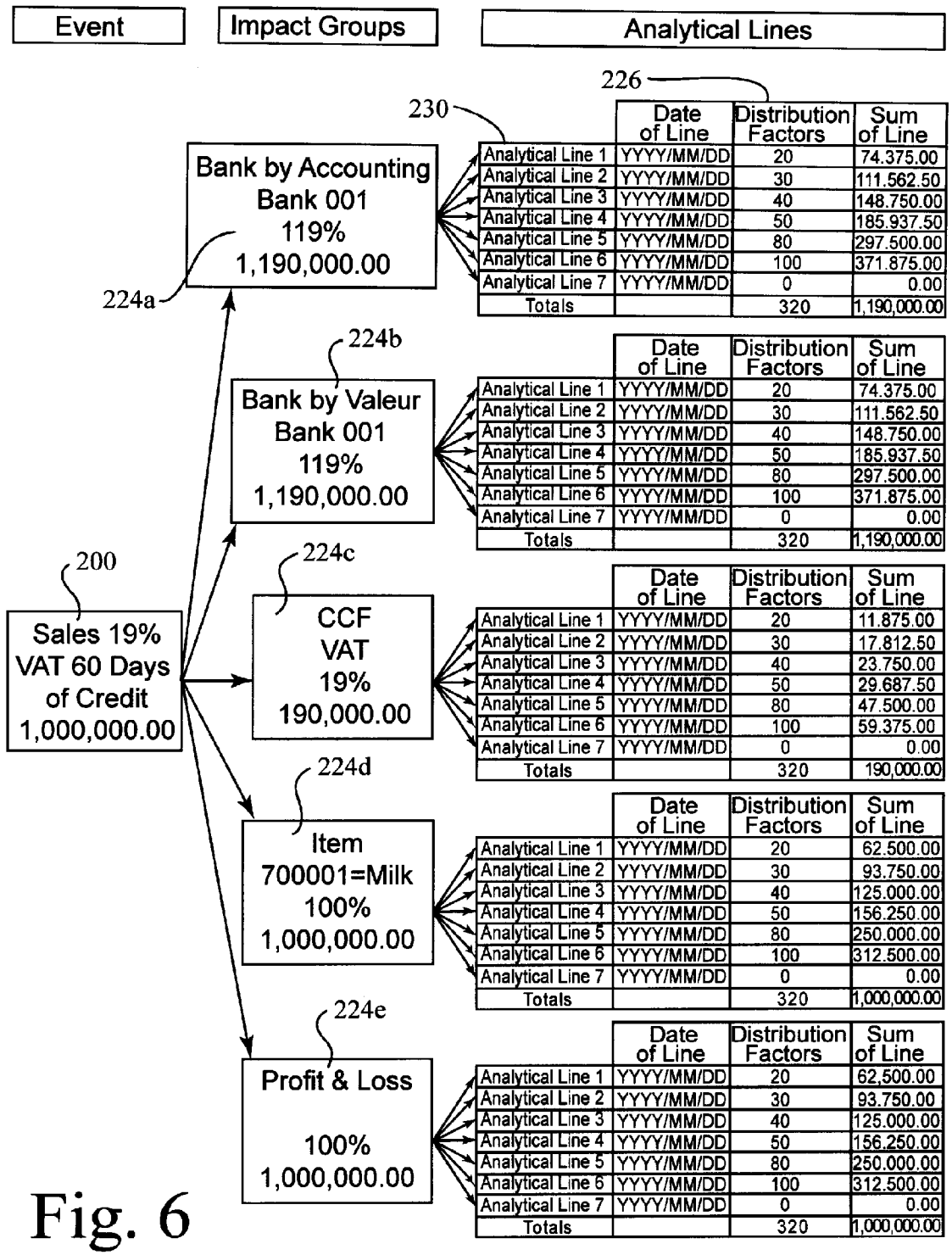
FIG. 6 is an exemplary representation of the relation of a primary entry, its impact group(s), and analytical lines derived therefrom in accordance with an embodiment of the invention.

The distribution factors 226 for a particular impact group 218 include one or more distribution factors that dictate the allocation of the value 202 of the primary entry 200 over the time period defined by the start date 204 of the primary entry 200 and the orientation period 220 of the impact group 218 associated therewith as described herein. Such allocation occurs in the fiscal year of the date of entry 204 of the primary entry 200. The allocation can be a constant sum, a percentage of the primary entry value (x/100), or in accord with any other manner of distribution. The allocation of the respective portion of the primary entry value 202 is designated to dates in the time period defined by the start date 204 of the primary entry 200 and the orientation period 220 of the impact group 218, in chronological order, on the basis of its assigned distribution factor. Each given date, the distribution factor for such date, and the sum portion of the primary entry value for such date are together referred to as an analytical line 230 for the account 224 of the impact group 218. The number of analytical lines 230 that are derived from the primary entry and impact group pair are determined by the orientation period 220 of the impact group. In the example of Table 1 and FIG. 6, the primary entry 200 is associated with an impact group 218 having an orientation period 220 of one week (seven days), resulting in seven analytical lines 230 for the 'bank by accounting' account 224a.

It is expected that an accountant (or financial accounting specialist) will be responsible for defining the impact groups 218 and associated event types 208 used by the methodology as described herein. Primary entries 200 can then be defined and linked to the pre-defined impact groups by other users (such as analysts and decision makers that are not specialist in financial accounting). Computer-assisted evaluation of the forecasted and/or calculated inflows and outflows represented by the primary entries can then be carried out by such users as described herein.

TABLE 1

Bank By Accounting

|  | Day | Distribution Factor | Calculation | Sum For Day |
|---|---|---|---|---|
| Analytical Line 1 | Monday | 20 | 1,190,000.00 * (20/320) | 74,375.00 |
| Analytical Line 2 | Tuesday | 30 | 1,190,000.00 * (30/320) | 111,562.50 |
| Analytical Line 3 | Wednesday | 40 | 1,190,000.00 * (40/320) | 148,750.00 |
| Analytical Line 4 | Thursday | 50 | 1,190,000.00 * (50/320) | 185,937.50 |
| Analytical Line 5 | Friday | 80 | 1,190,000.00 * (80/320) | 297,500.00 |
| Analytical Line 6 | Saturday | 100 | 1,190,000.00 * (100/320) | 371,875.00 |
| Analytical Line 7 | Sunday | 0 | 1,190,000.00 * (0/320) | 0.00 |
| Total |  | 320 |  | 1,190,000.00 |

Referring to Table 1, for the account 'bank by accounting' 224a, analytical line 1 on a first date (a Monday) 60 days from the date of sale (per the terms of the credit), subject to rules to find dates processing as discussed below, a calculated sum representing an allocated portion of the sale including taxes (VAT) is recognized. The sum is allocated according to the distribution factors 226 of the impact group 218. This process is repeated for six additional dates as dictated by the week orientation period 220 of the impact group 218. In this manner, the distribution factors 226 provide a weighting of the analytical lines relative to each other for the allocation of the value of the primary entry over the week time period. In the example shown, analytical line 1 (a Monday) is assigned a distribution factor of 20 out of 320 (or 6.25%), and analytical line 6 (a Saturday) is assigned a distribution factor of 100 out of 320 (31.25%)), it is being recognized that Saturday is generally five times as busy as Monday for supermarket shopping. It is also seen how the other analytical lines are respectively weighted according to their distribution factors (in view of forecasted sales on respective days of week, with analytical line 1 representing Monday (distribution factor of 20 out of 320 or 6.25%), analytical line 2 representing Tuesday (distribution factor of 30 out of 320 or 9.375%), analytical line 3 representing Wednesday (distribution factor of 40 out of 320 or 12.5%), analytical line 4 representing Thursday (distribution factor of 50 out of 320 or 15.625%), analytical line 5 representing Friday (distribution factor of 80 out of 320 or 25%), analytical line 6 representing Saturday (distribution factor of 100 out of 320 or 31.25%), and analytical line 7 representing Sunday (distribution factor of 0 out of 320 or 0%)).

For the 'bank by valeur' account 224b, the same method is carried out for determining a sum for each of the analytical lines over the week period for the 'bank by valeur' account. A distinction between the analytical lines for the 'bank by accounting' and 'bank by valeur' accounts will be the dates when the sums are recognized, and when interest is payable by the bank and payable to the bank (depending on debit or credit balances). As discussed further below, the dates on which the calculated sums for 'bank by valeur' account are applied will be affected by non-working days and non-banking days.

The 'Calculated cash flow' (CCF) account 224c represents inflows or outflows that are conditional on nature. Examples of such conditional inflows and outflows include payment of VAT taxes collected as VAT taxes will only be payable if there is a credit balance in the appropriate account. In another example, interest expense payments are conditional in nature because they are payable only when there is a credit balance. In yet another example, interest credits are conditional in nature because they are payable only when there is a debit balance. In yet another example, tax payments are conditional in nature and need to be calculated based on appropriate criteria (e.g., bank account balances). In another example, taxable income calculations are conditional in nature and need to be calculated based on other calculations (e.g., gross profits, deductible expenses, deductible tax payments, deductable interest credits, and deductable interest payments—step 139 of FIG. 1). In yet another example, net income and its allocation are conditional in nature and need to be calculated based on other calculations (e.g., taxable income, non-deductible expenses, certain interest credits and payments, non-deductible tax payments and income tax payments—step 143 and 145 of FIG. 1). In other examples, inventory and other cost of goods calculations are conditional in nature (e.g., item valuations, overhead costs and warehousing—step 107 of FIG. 1). Separate codes may be used for the different types of inflows and outflows (VAT, interest income, interest expense) for the CCF account 224c. The CCF account codes are used to derive analytical lines for accounts corresponding thereto. In the example shown, the processing of the CCF account code for VAT is shown schematically. The result of the CCF processing generates primary entries and analytical lines for the appropriate accounts. The analytical lines are then grouped into accounts (targets of impact) as described below.

The processing for the calculated cash flow account is discussed in more detail below.

For the account 'item' 220d, the sales of individual items (not including taxes) for the primary entry 200 are forecasted and allocated across the analytical lines 230. While the primary entry of the example includes a single item, it is appreciated that the primary entry may include multiple items, each with respective codes.

For the account 'profit and loss' 220e, the calculated profits and loss for the primary entry 200 are forecasted and allocated across the analytical lines 230.

From the above, it is seen that a sum is determined for each analytical line 230 for the accounts of the impact groups associated with the primary entry. The sum is calculated by multiplying the value of the primary entry by the corresponding allocation percent for the account of the impact group.

Rules to Find Dates

In deriving the analytical lines as described herein, the investment evaluation application preferably performs operations that adjust the dates for the analytical lines according to a predefined set of rules as described herein. More specifically, such operations check whether the date associated with a particular analytical line is a "company working day" or not and checks whether the date is a "bank working day" or not, and shifts the date for the analytical line if appropriate. "Company working days" and "Bank working days" are preferably defined by user input as described herein. More specifically, if the date is a non-working day, rules are followed to find the appropriate working day to which the analytical line 226 is assigned as described below in detail. Such rules may be contained in a table or other file (see Table a11 below) that has rules for handling calculated dates that are not company working days and/or not bank working days. In addition, there are other rules for finding the dates on which the sum of an analytical line should be applied for specific circumstances. Examples of such rules include: (i) not making any day shift at all, (ii) making a day shaft to the next working day, (iii) making a day shift to the immediately previous working day, etc. Such rules are important for ensuring that taxes and interest (payable and receivable) are properly assigned to the appropriate date. Note that the user can specify calendar months, which can be used as part of the rule to find dates operations as described herein. For example, in order to shift a date by a calendar month (see FIG. 8), the data characterizing the calendar months as specified by the user can be analyzed to derive the appropriate date for the shift.

More specifically, if it is determined that a rule must be followed to find a date, calculations to determine such date are made. The fiscal year of the date is determined, and the month of the date is identified. This information is expressed through four separate date related data:

1) the "fiscal year";
2) the month of the "fiscal year", expressed as a sequential number of the specific month in the specific "fiscal year";
3) the day of the month to which it belongs, expressed as sequential number of the specific day in the specific month; and
4) the day of the "fiscal year" to which it belongs, expressed as sequential number of the specific day in the specific "fiscal year".

For example, for a "fiscal year" starting on "July 1 of 2007" and ending on "June 30 of 2008", the date "August 15 of 2007" is analyzed as the second month of the current "fiscal year", the fifteenth sequential day of the second month, and the forty-sixth sequential day of the current "fiscal year."

If required by some circumstance, rules described in the files of Table a11 (discussed below) are applied in the actions that follow.

Figure 7:
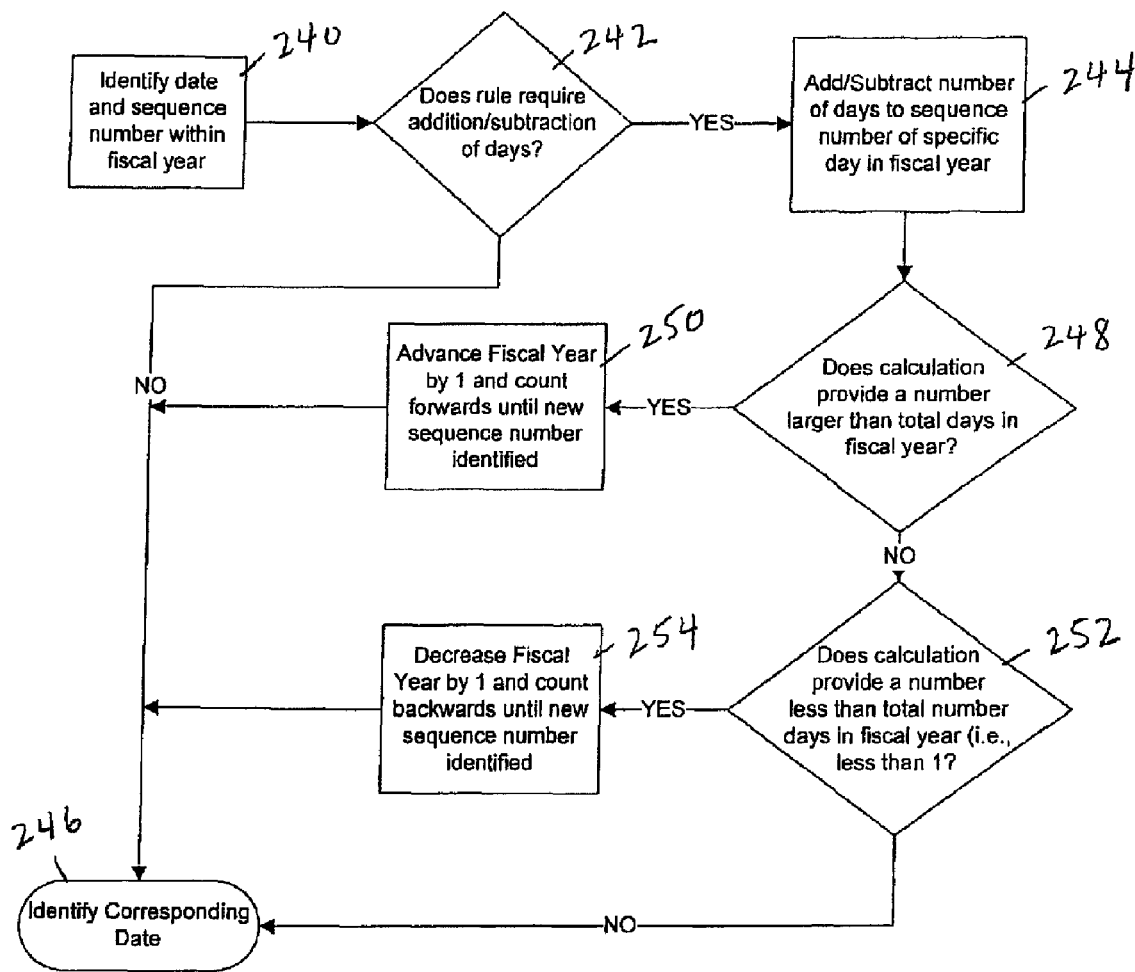
FIGS. 7 and 8 are flow charts of methodology for adjusting dates assigned to analytical lines in accordance with a set of predetermined rules as part of the computer implemented methodology for investment evaluation in accordance with the present invention.

Turning to FIG. 7, in the event that an addition or subtraction of days is required for a specific date, its sequence number within a fiscal year is identified 240. If the rule requires an addition or subtraction of days at 242, the number of days to be added or subtracted is added or subtracted to the sequence number at 244 to the day within the "fiscal year" to identify the sequence number of the new day in the "fiscal year", which is then used to determine a corresponding new date at 246, albeit in view of other potential considerations day shifting considerations which follow.

If an addition is performed at 244 and such causes the sequence number of the new date to be larger than the total number of days for the specific "fiscal year" at 248, then the additional days are counted into the days of next "fiscal year" for the company until the new sequence day is identified at 250.

If a subtraction is performed at 244 and such causes the sequence number of the new date to be less than one at 252, then days are counted backwards into the prior "fiscal year" for the company until the new sequence day is identified at 254.

Figure 8:
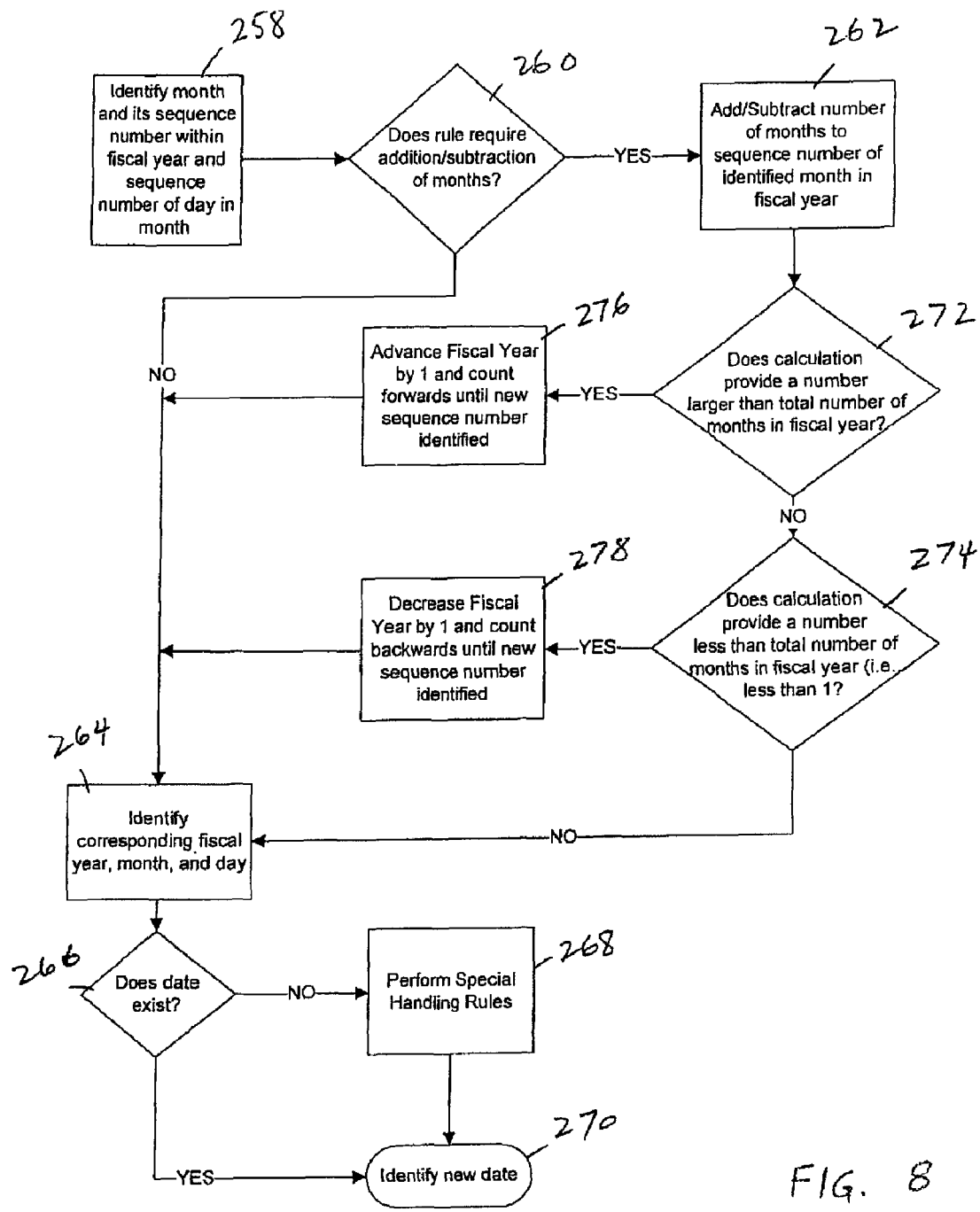

Referring to FIG. 8, in the event that an addition or subtraction of months is required at 260, then while maintaining constant the sequential number of the specific day within the month (previously identified at 258), the identified number of months for shift is added or subtracted at 262 to find the new sequential number of the month within the "fiscal year". Assuming that the addition or subtraction of months does not cause a change in "fiscal year", the combination of "fiscal year", the sequential number of month in the "fiscal year", and the sequential numbering of day in the month, identifies a new date at 264. If the fiscal year, month and date are calculated to a date that does not exist (e.g., 31st day of February) at 266, then special rule(s) of handling of such dates (e.g. shift to the last valid date of the running month, or shift to the first date of the next month, etc.) is/are applied at 268 to identify a new date at 270. This logic is in effect in all stages of calculation. Otherwise, as the date identified at 264 is the new date at 270.

Referring back to 262, in the event that after the addition or subtraction of months a sequential numbering of month larger than the total number of months of the specific "fiscal year" is calculated at 272, or a number smaller than the number 'one' is calculated at 274, then respective special handling rule-based shifts (similar to the shift applied for days), are applied at 276 and 278, respectively, to arrive at the correct month.

Other shifts are possible. For example, in the event that an addition or subtraction of "fiscal year" is defined, while maintaining constant the sequential numbering of the specific month in the "fiscal year" and maintaining constant the sequential numbering of a specific day in the specific month of "fiscal year", the indicated next or previous "fiscal year" is calculated. Via the combination of "fiscal year", the sequential numbering of month in the "fiscal year" and the sequential numbering of day in the month, the new date is located.

In the event that a shift to a specific type of day is necessary (e.g., weekday of Friday), a check is made as to whether the calculated date has the specified type of day. If the result is positive, then no change takes place. If the result is negative, then a shift to the immediately next date takes place and the check is made again as to whether the result is positive. If not, the process is repeated until the result is positive.

It is possible, in the context of shifting to a consecutive date, that a day in another "fiscal year" can be identified. It is also possible to define the direction of the date shift to be future or past.

In the event that a calculation requires a shift to a specific day of a month (e.g. the 10th day of the month), a check is made as whether the calculated date has the same sequential numbering as a day of the month to which it presently belongs (i.e., as to whether it is already the 10th of the month). If the result is positive, then no change takes place. If it is negative, then a shift to the immediately next date in sequence and the same check is made until the result is positive.

It is possible that a rule may permit more than one specific day of a month to satisfy one of the above checks, for example, the 5th, the 15th or the 25th day of month. In this case, during the check, the first day to satisfy the rule provides a positive result.

In addition, a check is made to determine whether the calculated date is designated as a working date for the company or not. Differentiation will take place on the basis of the impact group to which the specific analytical line leads, in order to determine whether the characterization "company working day" or the characterization "bank working day" will be used.

If it is determined not to be a working date, application of a suitable rule, as discussed above, will take place. Examples of such rules might be: not to make any day shift at all, or to make a day shift to the immediately next working day, or to make a day shift to the immediately previous working day, etc.

FIG. 11 illustrates an example of the adjustments made to days of analytical lines that flow from a primary entry with a date of entry of Jan. 25, 2007. The adjustments are based on exemplary rule that shifts an initial date for entry by a sequence of four operations. The first operation adds a predetermined number of days (30 days) to the initial date to derive a new date. The second operations checks whether the new date is a "bank working day" or not, and if not replaces the new date with the next bank working day. The third operation adds a predetermined number of days (2 days of valeur) to the resultant day output from the second operation to derive a new date. The fourth operation checks whether this new date is a "bank working day" or not, and if not replaces the new date with the next bank working day. Similar rules can operate to shift dates across company non-working days for appropriate primary entries.

Calculated Cash Flows

As discussed above, some of the forecasted or calculated inflows and outflows are uncertain or conditional in nature (for example, dependent upon the satisfaction of some criterion). In the preferred embodiment, the investment evaluation application defines these incidents as entries in a particular account (for example, a "calculated cash flow" (CCF) account as described) and associates codes for the various types of entries in this particular account. The result of the CCF processing generates primary entries and analytical lines for the appropriate accounts. The analytical lines are then grouped into accounts (targets of impact).

In the illustrative embodiment, the decision-making as to whether or not such incidents will occur, and the result thereof if they do occur, are based on the following:

1) a data source from which the related data is extracted and which indicates whether the criterion of the incident is met ("data source for calculation"; example of such data source might be any one of the "targets of impact" and further analysis thereof (where applicable));
2) the basis by which the data source is evaluated for the decision making ("basis for calculation");
3) the criterion (referred to herein a "CCF criterion") that must be satisfied in order for the calculation to be permitted ("purpose of the calculated cash flow");
4) an "event type" used to designate the calculation and its effect;
5) the "fiscal year" day(s) on which an evaluation takes place as to whether the CCF criterion is met (referred to herein as "CCF calculation breakpoint(s)"); and
6) calculation rates that are applied to the "basis of calculation" so that a result number will be exported.

Figure 9:
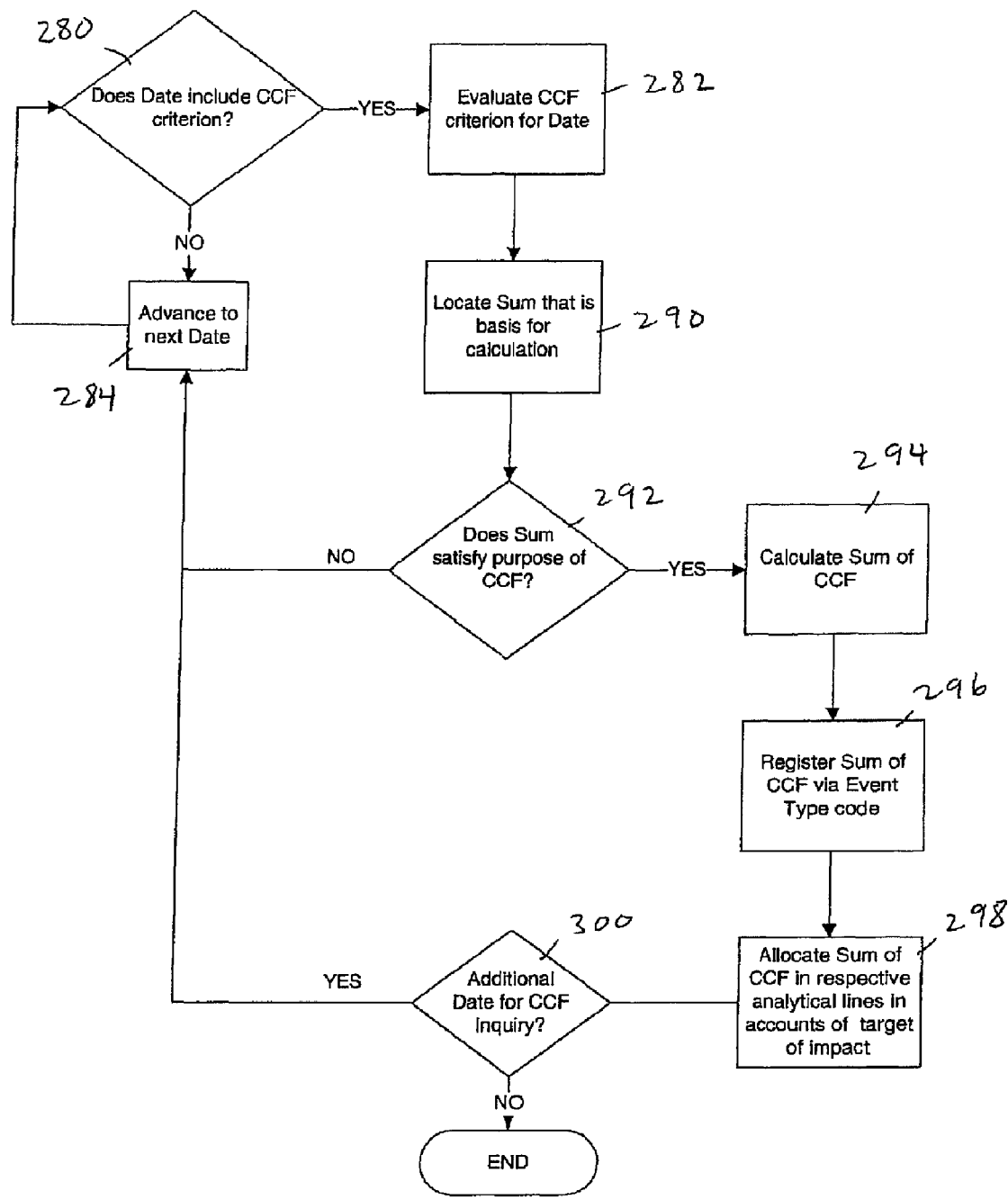
FIG. 9 is a flow chart of a methodology for evaluating a calculated cash flow criterion as part of the computer implemented methodology for investment evaluation in accordance with the present invention.

Referring to FIG. 9, to initiate calculation of the entries of the CCF account, a sequential check of the dates of a given "fiscal year" is made at 280. If the date under consideration includes a characterization that indicates that the CCF criterion should be evaluated, then it is so evaluated at 282. Otherwise, the date is advanced at 284 to the next CCF calculation breakpoint date and the CCF criterion is considered for the new date again at 280. If a specific date includes a characterization for more than one CCF breakpoint, then a suitable methodology is used for determine the order for conducting these evaluations (e.g., priority codes, etc.).

Once a date is indicated as having CCF criterion from the "data source for calculation" at 282, a subsequent calculation is carried out. From the "data source for calculation", the sum that is the "basis for calculation" is located at 290. Examples of "basis for calculation" include the balance on the date of calculation, the balance on each date from the next date of the previous date of calculation up to the present date of calculation, the sum of until now unused movements, etc.

Then a check is made at 292 as to whether the sum that is the "basis for calculation" satisfies the "purpose of the calculated cash flow". Examples of "purpose of the calculated cash flow" include (i) action on debit balance, (ii) action on credit balance, (iii) consolidation (regardless of type of balance), (iv) calculation with rate on debit balance, (v) calculation with rate on credit balance, (vi) calculation with rate (regardless of type of balance), (vi) action if the balance is above some limit, (vii) action if the balance is below some limit, etc. If the "purpose of the calculated cash flow" is satisfied 292, then the sum of the "calculated cash flow" is calculated at 294. If applicable, use of calculation rates takes place. If the sum does not satisfy the "purpose of the calculated cash flow", the date is advanced at 284 to the next CCF calculation breakpoint date.

At 296, the sum of the "calculated cash flow" calculation is registered as a primary entry 200 with an appropriate event type 208 and date of entry 204 based on the CCF calculation breakpoint. Then, at 298, the primary entry resulting from the "calculated cash flow" calculation is allocated to respective analytical lines 226 according to the impact group 218 associated therewith.

At 300, it is determined if there are additional dates for CCF inquiry. If so, the operations continue to 284 to advance the date and repeat the operations of 280 to 300 for the next CCF calculation breakpoint. If not, the operations end.

Variation Factors

For any numeric value used in the "investment evaluation application", it is possible to apply a variation factor thereto. A variation factor permits the application to quickly and conveniently model scenarios that affect a primary entry or item. The variation factor can affect the price, quantity or total value (price×quantity) of a primary entry or item so that various 'what if' scenarios can be quickly modeled without necessitating a change to each entry. The variation factor affects all associated entries at once, and can be modified, activated or deactivated from, e.g., a menu selection. In addition, multiple variation factors can be similarly applied to simulate the effect of a combination of factors on e.g., sales of an item. In this manner, multiple variation factors can be bundled by a common designator or code and used for a common rule of action. Variation factors can also affect Distribution Factors for one or more Impact Groups and possibly other numerical values that are input by the user.

More specifically, preferably before any use of a numeric value in a calculation, a check is made as to whether the numeric value is associated with a "variation factor" code. If there is such an association, then before the calculation (or in conjunction therewith), then rules in which the "variation factor" code are described are applied to the numeric value (of the calculation). Examples of such rules include:
 1) addition or subtraction to the original numeric value of a percentage equal of the numeric value of the "variation factor";
 2) multiplication of the original numeric value with a percentage equal to the numeric value of the "variation factor";
 3) addition or subtraction to the original numeric value of the numeric value of the "variation factor"; and
 4) replacement of the original numeric value with a numeric value in indicated by the "variation factor".

Annual Entries

Primary entries are generally associated with an orientation of one week or one month (or other period shorter than a fiscal year). Entries that are annual (referred to herein as "annual entries") may also be forecasted and divided into multiple primary entries associated with impact groups of shorter orientation periods. Alternatively, according to the invention, the investment evaluation application can accommodate annual entries by providing a user-controlled mechanism that converts an annual entry into a plurality of monthly primary entries (or a plurality of weekly primary entries or a plurality of primary entries of any arbitrary period shorter than the annual period) each with a date of entry and an allocated value.

| Period (Month) | Fiscal Year | Distribution Factor | Sales | Event Type Name | Impact Group Name |
|---|---|---|---|---|---|
| 1 | 2008 | 20 | 23.529,41 | Sales01 | Sales w/ JAN Distribution Factors |
| 2 | 2008 | 30 | 35.294,12 | Sales02 | Sales w/ FEB Distribution Factors |
| 3 | 2008 | 40 | 47.058,82 | Sales03 | Sales w/ MARCH Distribution Factors |
| 4 | 2008 | 50 | 58.823,53 | Sales04 | Sales w/ APRIL Distribution Factors |
| 5 | 2008 | 60 | 70.588,24 | Sales05 | Sales w/ MAY Distribution Factors |
| 6 | 2008 | 80 | 94.117,65 | Sales06 | Sales w/ JUNE Distribution Factors |
| 7 | 2008 | 120 | 141.176,47 | Sales07 | Sales w/ JULY Distribution Factors |
| 8 | 2008 | 200 | 235.294,12 | Sales08 | Sales w/ AUG Distribution Factors |
| 9 | 2008 | 150 | 176.470,59 | Sales09 | Sales w/ SEPT Distribution Factors |
| 10 | 2008 | 60 | 70.588,24 | Sales10 | Sales w/ OCT Distribution Factors |
| 11 | 2008 | 30 | 35.294,12 | Sales11 | Sales w/ NOV Distribution Factors |
| 12 | 2008 | 10 | 11.764,71 | Sales12 | Sales w/ DEC Distribution Factors |
| Totals | | 850 | 1.000.000,00 | | |

Figure 10:
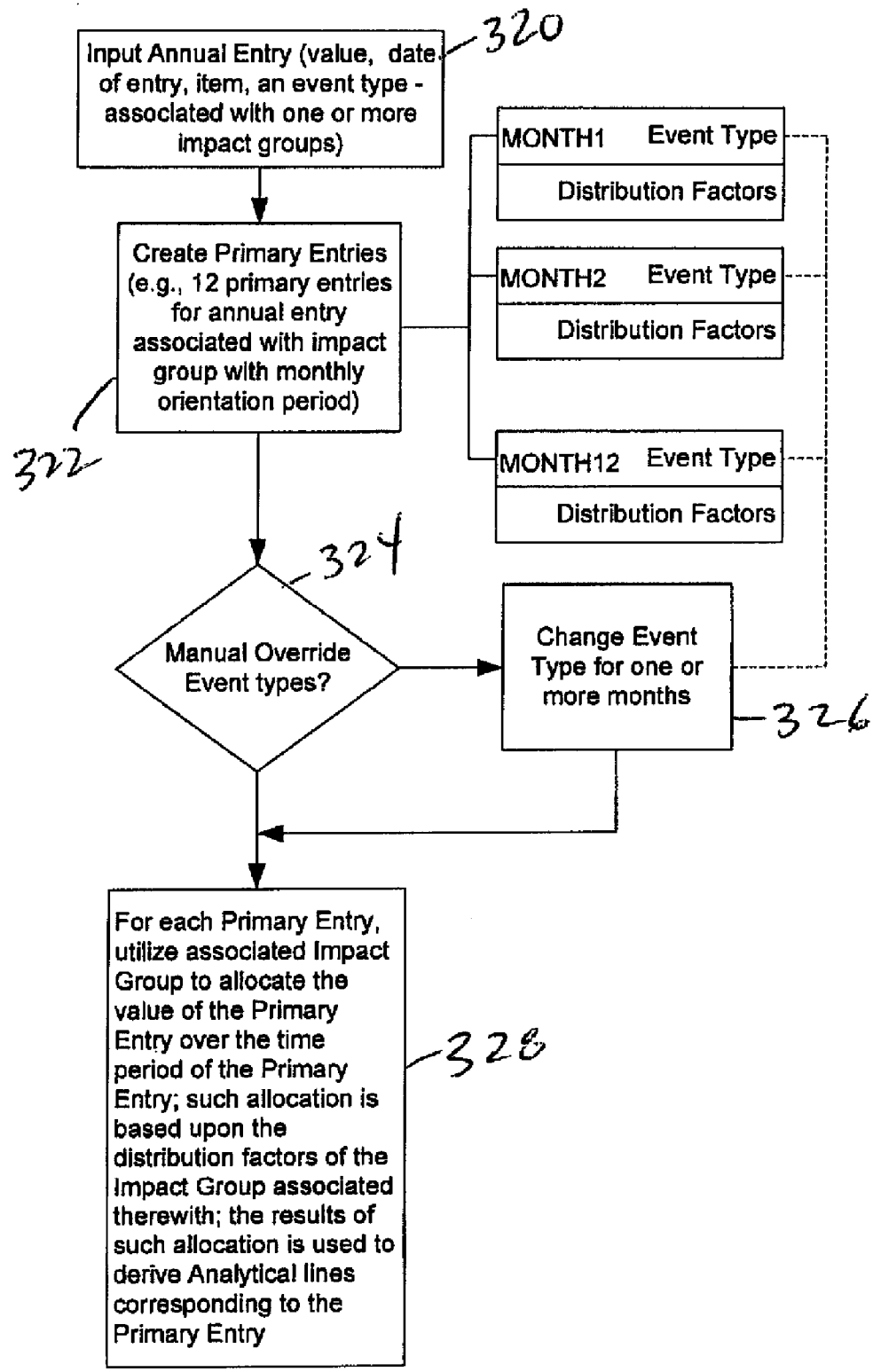
FIG. 10 is a flow chart of methodology for allocating an annual entry across multiple primary entries within a fiscal year as part of the computer implemented methodology for investment evaluation in accordance with the present invention.

Referring to FIG. 10 and Table 2, at 320 the user specifies an annual entry, which defines a value, orientation period, date of entry, item, one or more event types, and distribution factors similar to those of the primary entry and impact group as described above. The distribution factors of the annual entry are used to allocate the value of the annual entry over a number of primary entries (the number of primary entries dictated by the orientation period of the annual entry). The event type(s) of the annual entry associate impact group(s) with the primary entries that flow from the annual entry. At 322, the investment evaluation application automatically creates a sequence of primary entries with the event type(s) defined by the annual entry. The event type(s) for these primary entries associates these primary entries with one or more impact groups. For example, consider the case where the user specifies that the annual entry has a "month" orientation period. In this case, a sequence of twelve primary entries is created at 322. The date of entry 204 of each primary entry in the sequence is offset by one month, starting the first day of each one of the months of the fiscal year. In this example, the primary entries are different "sales" event types that are associated with impact groups that include distribution factors that reflect seasonality. Optionally, other parameters can be provided as well. In addition, the application also provides the opportunity at 324 to manually override automatically assigned event types and distribution factors for any one or more of the primary entries at 326. In 328, the sequence of primary entries defined in 322-326 is processed as described above to create analytical lines for each one of the primary entries. Each primary entry is allocated over the orientation period of the impact group(s) associated therewith (e.g., over the month periods in the example shown) in accordance with the distribution factors of the impact group(s) associated therewith. Similar operations can be carried out to derive a number of weekly or other period primary entries for a given annual entry.

As shown in Table 3, the allocation across the days of week or month (or other period) of a primary entry can be different depending on where in the year (the seasonality) that the period falls out. For example, the distribution factors of week 3 (occurring, e.g., in January; i.e., from the distribution factors in the impact group "Sales with JAN distribution factors", Table 2) may be different than those of week 31 (occurring, e.g., in August; i.e., from the distribution factors in the Impact Group "Sales with AUG distribution factors", Table 2).

TABLE 3

| | Distribution Factors | |
|---|---|---|
| | Week 3 | Week 31 |
| Mon | 20 | 40 |
| Tue | 30 | 45 |
| Wen | 40 | 52 |
| Thu | 50 | 60 |
| Fri | 80 | 65 |
| Sat | 100 | 90 |
| Sun | 150 | 92 |
| Totals | 470 | 444 |

Zero Mode

The investment evaluation application preferably supports different operational modes as described below. In a first mode of operation, a first user (e.g., typically a user responsible for budgeting or other accounting tasks) has access to confidential company information to input back-end entries related thereto into the program as well as to generate and review results calculated thereon. The first user can then dictate that the data and results generated by the first user can be accessed by zero mode operation and associates a password with such zero mode operation. A second user (e.g., a marketer) can then receive the data and results (preferably as part of one or more data files). In the zero mode of operation, the second user has limited rights to access the data and results generated by the first user. Preferably, the zero mode of operation permits the second user to modify factors, e.g., variation factors, which are used in various 'what if' scenarios and/or add new primary entries for analysis. The computer-implemented evaluation of the investment can be recalculated based upon such changes. In the preferred embodiment, the results that are reported to the second user in the zero-mode of operations include only the differences in the results of the evaluation analysis that stem from the changes input by the second user in the second mode of operation and not the actual results of the evaluation analysis. In this manner, the application presents to the second user the results of the 'what if' scenarios as compared to the results without the second-user's modifications.

Tables

Exemplar information files (or organized as individual files or otherwise) containing information potentially useful in the analysis according to the method includes the following:

a1) Tables which include at least codes that will be used for the grouping and summing of values; i.e., targets of impact, with relevant information that can be used. Examples of such information are description, date, sum, balance, sub categorization if applicable etc.

a2) Tables which include at least codes of currencies, with relevant information that can be used. Examples of such information are description, number of decimal digits, buy rate fluctuation from the fixing price, sell rate fluctuation from the fixing price etc.

a3) Tables which include at least codes of companies, with relevant information that can be used. Examples of such information are description, basic currency of calculation of economic results and accounting book keeping, type of calendar that is being observed, etc.

a4) Tables which include at least codes of "fiscal years", with relevant information that can be used. Examples of such information are description, company with which they are correlated, day of beginning, day of ending, number of months that are included in it, etc.

a5) Tables which include at least codes of days, with relevant information that can be used. Examples of such information are description, type of weekday, code of the "fiscal year" to which they belong, if it is a working day for the company, if it is a working day for the banks, limits of each month, limits of user defined sub periods (such as a fiscal quarter), etc.

a6) Tables which include at least types of weekdays, with relevant information that can be used. Examples of such information are description, etc.

a7) Tables which include at least "types of periods" to which a "fiscal year" can be subdivided, with relevant information that can be used. Examples of such information are description, duration, longest day duration, type of first day of week, etc.

a8) Tables which include at least periods, which they constitute subdivisions of "fiscal years", with relevant information that can be used. Examples of such information are description, "fiscal year" to which they belong, "type of period", date of beginning, date of ending, rules of handling of non working days of period, etc.

a9) Tables which include at least codes for grouping of information, with relevant information that can be used. Examples of such information are description, etc.

a10) Tables which include at least codes that are useful in order that any numerical value that has been associated with them can be transformed via the application of rules which are described in these (indicatively we could name them "variation codes"), with relevant information that can be used. Examples of such information are description, numerical value, rule of application of numerical value in the connected numerical price (e.g. action with percentage, action with number, action with integer, replacement of value with another one), etc.

a11) Tables which include at least codes that are useful in order that any date that has been connected with them can be changed into another one, with relevant information that can be used. Examples of such information are description, indication for no change of initial date, number of days or months or years or "fiscal years" that will be added or subtracted to the initial date, fixed sequence of date of month that will replace that of initial date, fixed sequence of month of year or "fiscal year" that will replace that of initial date, number of days of valeur that will be added, dates of month in which the calculated date will change via date shift if the calculated date is not identified with one of them, type of weekday to which the calculated date will change via date shift if the calculated date is not identified with it, rules of handling of calculated dates if they are not "company working days" or if they are not "bank working days", "variation factors" associated with numerical values of included information, grouping codes, etc.

a12) Tables which include at least items, with relevant information that can be used. Examples of such information are description, if the item is material or service, grouping codes, etc.

a13) Tables which include at least codes that will be used for the entering of incidents that will be analyzed (indicatively we could name them "event type" codes), with relevant information that can be used. Examples of such information are description, grouping codes, etc.

a14) Tables which include at least banking accounts of the business entity, with relevant information that can be used. Examples of such information are description, currency of account, company to which the bank account belongs, etc.

a15) Tables which include at least incidents or calculations thereon are dependent upon meeting some criterion (also referred to as "calculated cash flows" or CCFs), with relevant information that can be used therewith. Examples of such information are description, impact target (and if applicable, further subdivision(s) thereof), data source for calculation, basis for the calculation (i.e., which data in the "data source" will be considered), criterion which should be satisfied, action that will turn the result of calculation into new data, etc.

a16) Tables which include at least analytic incidents (per date and per impact group) in which the economic incident will be analyzed (i.e., "analytical line" codes), with relevant information that can be used. Examples of such information are description, allocation factor, code of the "impact group" in which they are assembled, sequential numbering, etc.

a17) Tables which include at least codes of grouping of "analytical lines" in which the economic incident will be analyzed (i.e., "impact group" codes), with relevant information that can be used. Examples of such information are description, "type of period" in which it will be analyzed, "impact target" to which it is relevant (and further analysis of it, if applicable), sum that will be allocated to codes of "analytical lines" expressed in suitable way (e.g. as a fixed sum, or as percentage of the entered economic incident, etc), code of "event type" with which it is associated, forms of the "analytical lines" to which it will be analyzed, behavior of the "analytical lines" to which it will be analyzed, "variation factors" connected with numerical values of included information, codes of grouping, codes of "rules to find date", rules of handling "analytical lines" that are beyond the contents of the period of the "fiscal year", etc.

a18) Tables which include at least correlations between various codes of "impact groups", in order that via those correlations it is possible to calculate the foreign exchange differences, with relevant information that can be used. Examples of such information are description, associated codes of "impact groups", etc.

a19) Tables which include at least dates of "fiscal year" on which a query will be performed for the purpose of determining whether a "calculated cash flow" calculation will take place (i.e., a "calculated cash flow breakpoint"), with relevant information that can be used. Examples of such information are description, code of "calculated cash flow", dates in which the calculation will take place, priority number within the date, etc.

a20) Tables which include at least rates that will be used by the "calculated cash flow" codes in order to conduct a calculation, with relevant information that can be used. Examples of such information are description, code of "calculated cash flow", limits of effect (date from/date to), rate, sum of base of calculation, limits of application in combination the value (sum from/sum to), if the rate is graduated or escalated, etc.

a21) Tables which include at least exchange rates of various currencies with each other, with relevant information that can be used. Examples of such information are description, codes of the currencies involved, date limits of effect (date from/date to), exchange rates (e.g. fixing, buy, sell), etc.

a22) Tables which include at least financial incidents (i.e., "primary entries"), with relevant information that can be used. Examples of such information are description, date that the incident will take place, code of "event type", type of currency involved, item code, quantity, price of unit, total value, "variation codes" connected with numerical values of included information, etc.

a23) Tables which include at least "calculation tasks", with relevant information that can be used. Examples of such information are description, time determination of beginning, time determination of end, company, determination of methodology for valuation of residual stock of items, etc.

a24) Tables in which are portrayed at least opening balances per "calculation task" and per "impact group", with relevant information that can be used. Examples of such information are description, "calculation task" code, "impact group" and further analysis of it if applicable, value, quantity, etc.

a25) Tables in which are portrayed at least months of "fiscal year", with relevant information that can be used. Examples of such information are description, "fiscal year" to which they belong, date limits (date from/date to), etc.

There have been described and illustrated herein several embodiments of a computer-implemented method for evaluating an investment and a financial analysis application based thereon. While particular embodiments of the invention have been described, it is not intended that the invention be limited thereto, as it is intended that the invention be as broad in scope as the art will allow and that the specification be read likewise. Thus, while particular data structures and formulaic expressions have been disclosed, it will be appreciated that other data structures can be used as well. In addition, while particular calculations have been disclosed for determining particular terms (such as costs of goods sold, gross profits, taxable income, net income, etc.), it will be understood that other calculations can be used. Also, while particular calculations have been disclosed for discounting forecasted inflows and outflows to a net present value, it will be recognized that other discounting-type calculations can be used as well. It will therefore be appreciated by those skilled in the art that yet other modifications could be made to the provided invention without deviating from its spirit and scope as claimed.

What is claimed is:

1. A computer-implemented method carried out by a computer processing system for forecasting financial activity of a business entity, the method comprising:
   i) interacting with a user to define at least one entry and at least one impact group,
      wherein the entry includes at least a value pertaining to forecasted financial activity of the business entity, a date pertaining to the value of the entry, and an impact group associated with the entry, and
      wherein the impact group includes a time period type that specifies a time period relative to the date of an associated entry and at least one distribution factor that dictates allocation of the value of the associated entry over the time period specified by the time period type of the impact group;
   ii) storing data on the computer processing system, the data representing the at least one entry and the at least one impact group;
   iii) processing the data on the computer processing system to generate at least one analytical line corresponding to each given entry represented by the data stored in ii), the respective analytical line including a value and a date, wherein the value of the respective analytical line is based upon the value of the corresponding entry and the at least one distribution factor for the impact group that is associated with the corresponding entry, and wherein the date of the respective analytical line is based upon the date for the corresponding entry and the time period type for the least one impact group that is associated with the corresponding entry; and
   iv) processing the analytical lines generated in iii) on the computer processing system to simulate information that forecasts financial activity of the business entity, wherein the processing of the analytical lines involves grouping the analytical lines as dictated by the impact groups associated with the entries corresponding to the analytical lines.

2. A method according to claim 1, further comprising:
   v) storing the information generated in iv) on the computer processing system for subsequent financial analysis of the business entity.

3. A method according to claim 1, wherein:
   the impact group of the data stored in ii) specifies at least one account that represents financial activity of the business entity; and the grouping of the analytical lines in iv) utilizes the value and date of a given analytical line to update the least one account specified by the impact group associated with the entry corresponding to the given analytical line.

4. A method according to claim 1, further comprising:
interacting with a user of the computer processing system to define at least one an event type, wherein each respective event type is associated with at least one impact group; and
for each given entry defined in i), the user interacts with the computer processing system to specify a particular event type that is associated with the given entry in order to associate the at least one impact group associated with the particular event type to the given entry.

5. A computer-implemented method according to claim 1, further comprising:
storing on the computer processing system time period data that represents a plurality of time periods;
wherein the dates for the analytical lines generated in iii) are derived from said time period data.

6. A computer-implemented method according to claim 5, further comprising:
interacting with a user of the computer processing system to specify said plurality of time periods represented by said time period data.

7. A computer-implemented method according to claim 5, wherein:
the plurality of time periods correspond to one of a fiscal year, budget quarter, budget month, and budget week.

8. A computer-implemented method according to claim 5, wherein:
at least one of the plurality of time periods is user-defined and does not correspond to a calendar time period.

9. A computer-implemented method according to claim 1, further comprising:
generating a net present value result on the computer processing system by discounting at least a portion of the information generated in iv); and
storing said net present value result on the computer processing system for output as part of the financial activity of the business entity.

10. A computer-implemented method according to claim 1, further comprising:
adjusting at least one date for the plurality of analytical lines according to a predefined set of rules.

11. A computer-implemented method according to claim 10, wherein:
the rules involve checking whether the at least one date is at least one of: a "company working day" and a "bank working day."

12. A computer-implemented method according to claim 11, further comprising:
interacting with a user of the computer processing system to classify particular dates as at least one of: a "company working day" and a "bank working day."

13. A computer-implemented method according to claim 11, wherein:
the rules involve shifting a date by a first operation that adds a predetermined time value to a given date to derive a new date and a second operation that replaces the new date with the next company working day in the event that the new date is not a company working day.

14. A computer-implemented method according to claim 1, further comprising:
storing data on the computer processing system, the data representing at least one calculation that is conditional in nature and that pertains to one or more analytical lines for at least one particular account as well as condition data representing conditions corresponding to the at least one calculation;
processing the condition data on the computer processing system to evaluate the conditions represented by the condition data in order to determine if the corresponding calculation should occur; and
in the event that the processing of condition data determines that the corresponding calculation should occur, performing the corresponding calculation on the computer processing system in order to derive the one or more analytical lines for the at least one particular account that pertains to the calculation.

15. A computer-implemented method according to claim 14, wherein:
the data representing a given calculation comprises a date for analyzing the condition data associated with the given calculation.

16. A computer-implemented method according to claim 15, wherein:
the given calculation represents at least one of the following:
i) payment of VAT taxes;
ii) interest expense payments;
iii) interest credits;
iv) tax payments;
v) taxable income calculations;
vi) net income calculations;
vii) allocation of net income;
viii) inventory calculations; and
ix) costs of goods sold calculations.

17. A computer-implemented method according to claim 15, wherein:
the data representing the at least one calculation includes a priority code for determining order of calculations associated with the same date.

18. A computer-implemented method according to claim 1, further comprising:
interacting with a user of the computer processing system to specify at least one annual entry, the annual entry including at least a value and date associated therewith;
storing data on the computer processing system, the data representing the annual entry; and
processing the data representing the annual entry on the computer processing system to generate a plurality of entries corresponding thereto, the plurality of entries associated with a time period type less than the annual entry.

19. A computer-implemented method according to claim 18, wherein:
the annual entry includes a set of distribution factors that used to allocate the value of the annual entry over the plurality of entries derived therefrom.

20. A computer-implemented method according to claim 1, further comprising:
interacting with a user of the computer processing system to specify at least one variation factor associated with at least one numerical value for modeling scenarios that affect the financial activity of the business entity.

21. A computer-implemented method according to claim 20, wherein:
the at least one variation factor is associated with a numerical value representing at least one of price, quantity, and total value (price×quantity).

22. A computer-implemented method according to claim 20, wherein:
the at least one variation factor is associated with a numerical value representing distribution factors associated with one or more entries or annual entries.

* * * * *